US009684601B2

(12) United States Patent
Böttcher et al.

(10) Patent No.: US 9,684,601 B2
(45) Date of Patent: Jun. 20, 2017

(54) DATA PROCESSING APPARATUS HAVING CACHE AND TRANSLATION LOOKASIDE BUFFER

(75) Inventors: Matthias Lothar Böttcher, Cambridge (GB); Daniel Kershaw, Gratkorn (AT)

(73) Assignee: ARM Limited, Cambridge (GB)

( * ) Notice: Subject to any disclaimer, the term of this patent is extended or adjusted under 35 U.S.C. 154(b) by 946 days.

(21) Appl. No.: 13/468,548

(22) Filed: May 10, 2012

(65) Prior Publication Data
US 2013/0304991 A1  Nov. 14, 2013

(51) Int. Cl.
G06F 12/00  (2006.01)
G06F 12/0864  (2016.01)
G06F 12/1045  (2016.01)
G06F 12/1027  (2016.01)

(52) U.S. Cl.
CPC ...... *G06F 12/0864* (2013.01); *G06F 12/1027* (2013.01); *G06F 12/1054* (2013.01); *G06F 2212/1028* (2013.01); *G06F 2212/6082* (2013.01); *Y02B 60/1225* (2013.01)

(58) Field of Classification Search
USPC ......................................................... 711/128
See application file for complete search history.

(56) References Cited

U.S. PATENT DOCUMENTS

| 5,835,962 | A | 11/1998 | Chang et al. | |
|---|---|---|---|---|
| 8,015,386 | B1* | 9/2011 | Kulkarni et al. | 711/202 |
| 2001/0029556 | A1* | 10/2001 | Priem et al. | 710/23 |
| 2002/0133685 | A1* | 9/2002 | Kalyanasundharam | 711/207 |
| 2006/0195677 | A1 | 8/2006 | Tan | |
| 2007/0067567 | A1* | 3/2007 | Jiao et al. | 711/118 |
| 2007/0239955 | A1* | 10/2007 | Teh et al. | 711/168 |
| 2008/0114939 | A1 | 5/2008 | Mouton et al. | |
| 2008/0282034 | A1* | 11/2008 | Jiao et al. | 711/125 |
| 2009/0055580 | A1* | 2/2009 | Moscibroda | G06F 13/1642 711/104 |
| 2009/0300338 | A1* | 12/2009 | Caprioli et al. | 712/228 |
| 2010/0138611 | A1 | 6/2010 | Rappoport et al. | |
| 2010/0268895 | A1* | 10/2010 | Ghai et al. | 711/141 |

(Continued)

OTHER PUBLICATIONS

K. Inoue et al., Way-Predicting Set-Associative Cache for High Performance and Low Energy Consumption, Proceedings of the 1999 International Symposium on Low Power Electronics and Design—ISLPED, 1999, New York, 1999, pp. 273-275.

(Continued)

*Primary Examiner* — Charles Rones
*Assistant Examiner* — Nanci Wong
(74) *Attorney, Agent, or Firm* — Nixon & Vanderhye P.C.

(57) ABSTRACT

A data processing apparatus has a cache and a translation look aside buffer (TLB). A way table is provided for identifying which of a plurality of cache ways stores require data. Each way table entry corresponds to one of the TLB entries of the TLB and identifies, for each memory location of the page associated with the corresponding TLB entry, which cache way stores the data associated with that memory location. Also, the cache may be capable of servicing M access requests in the same processing cycle. An arbiter may select pending access requests for servicing by the cache in a way that ensures that the selected pending access requests specify a maximum of N different virtual page addresses, where N<M.

15 Claims, 16 Drawing Sheets

(56) References Cited

U.S. PATENT DOCUMENTS

| | | | |
|---|---|---|---|
| 2011/0231593 A1* | 9/2011 | Yasufuku et al. | 711/3 |
| 2011/0238941 A1* | 9/2011 | Xu et al. | 711/169 |
| 2012/0072702 A1* | 3/2012 | Pierson et al. | 712/207 |

OTHER PUBLICATIONS

M. Ghosh et al., "Way Guard: A Segmented Counting Bloom Filter Approach to Reducing Energy for Set-Associative Caches", Proceedings of the 14th ACM/IEEE International Symposium on Low Power Electronics and Design, New York, 2009, pp. 165-170.

D. Nicolaescu et al., "Reducing Power Consumption for High-Associativity Data Caches in Embedded Processors", Proceedings of the Design, Automation and Test in Europe Conference and Exhibition, 2003, 5 pages.

"Intel Advanced Vector Extensions programming Reference", Intel Corporation, Jun. 2011, 595 pages.

M. Powell et al., "Reducing Set-Associative Cache Energy via Way-Prediction and Selective Direct-Mapping", Proceedings, 34th ACM/IEEE International Symposium on Microarchitecture, MICRO-34, 2001, pp. 54-65.

R. Min et al., Location Cache: A Low-Power L2 Cache System, Proceedings of the 2004 International Symposium on Low Power Electronics and Design, ISLPED, 2004, 6 pages.

G. Keramidas et al., "Applying Decay to Reduce Dynamic Power in Set-Associative Caches", High Performance Embedded Architectures and Compilers, 2007, 15 pages.

A. Ma et al., "Way Memoization to Reduce Fetch Energy in Instruction Caches", In Workshop on Complexity-Effective Design, 28th ISCA, Jun. 2001, pp. 1-9.

C. Zhang et al., "A Way-Halting Cache for Low Energy High Performance Systems", Proceedings of the 2004 IEEE International Symposium on Low Power Electronics and Design, ISLPED, 2004. pp. 126-131.

Y. Chang et al., "Sentry Tag: An Efficient Filter Scheme for Low Power Cache", Seventh Asia-Pacific Computer Systems Architecture Conference, ACSAC, 2002, 6 pages.

J. Rivers et al., "On High-Bandwidth Data Cache Design for Multi-Issue Processors", ACM/IEEE International Symposium on Microarchitect, 1997, pp. 46-56.

A. Seznec et al., "Conflict-Free Accesses Strided Vectors and a Banked Cache", IEEE Transactions on Computers, Jul. 2005, vol. 54, No. 7 pp. 913-916.

C. Batten et al., "Cache Refill/ Access Decoupling for Vector Machines", Proceedings of the 37th International Symposium on Microarchitecture (MICRO-37'04), 2004, pp. 331-342.

S. Moyer, "Access Ordering and Effective Memory Bandwidth", University of Virginia, 157 pages.

K. Asanovic, "Vector Microprocessors," University of California, Berkeley, 1998, 268 pages.

C. Kozyrakis, Scalable Vector Processors for Embedded Systems, May 2002, IEEE Mirco, 2003, 150 pages.

R. Espasa et al., Tarantula: A Vector Extension to the Alpha Architecture, ACM SIGARCH Computer Architecture News, 2002, vol. 30, No. 2, pp. 281-292.

A. Musa et al., "Effects of MSHR and Prefetch Mechanisms on an On-Chip Cache of the Vector Architecture", 2008 IEEE International Symposium on Parallel and Distributed Processing with Applications, 2008, pp. 335-342.

Y. Funaya et al., "Cache Partitioning Strategies for 3-D Stacked Vector Processors", 3D Systems Integration Conference (3DIC), 2010 IEEE International, 2010, pp. 1-6.

H. Park et al., "A Novel Tag Access Scheme for Low Power L2 Cache", Design Automation & Test in Europe Conference & Exhibition (DATE), 2011, pp. 1-6.

S. Borker et al., The Future of Microprocessors, Communications of the ACM, 54(5), 2005, pp. 67-77.

B. Calder et al., "Predictive Sequential Associative Cache", Proceedings Second International Symposium on High-Performance Computer Architecture Feb. 1996, pp. 244-253.

G. Hamerly et al., "Simpoint 3.0 Faster and More Flexible Program Phase Analysis", Journal of Instruction Level Parallelism, 7(4), 2005, pp. 1-28.

Krashinsky et al., The Vector-Thread Architecture, the 31st Annual International Symposium on Computer Architecture, 2004, vol. 32, pp. 52-63.

AMD, Software Optimization Guide for AMD Family 15h processors, Technical Report 47414, AMD, 2011, 326 pages.

J. Henning, Computer Practices—SPEC CRU2000; Measuring CPU Performance in the New Millennium, Computer—IEEE Computer, 2000, 33(7), pp. 28-35.

Li et al., "McPAT: An Integrated Power, Area, and Timing Modelling Framework for Multicore and Manycore Architectures", Proceedings for the 42nd Annual IEEE/ACM International Symposium and Microarchitecture (MICRO 42), No. c, 2009, pp. 469-480.

N. Muralimanoher et al., CACTI 6.0: A Tool to Model Large Caches, HP Laboratories, 2009, 25 pages.

D. Nicolaescu et al., "Fast Speculative Address Generation and Way Caching for Reducing L1 Data Cache Energy", Computer Design, 2006, IEEE 2007, pp. 101-107.

International Preliminary Report on Patentability dated Sep. 2, 2014 in PCT/GB2013/051186, 15 pages.

Chinese First Office Action issued Nov. 2, 2016 in CN 201380023344.8 and English translation, 14 pages.

* cited by examiner

DATA PROCESSING APPARATUS HAVING CACHE AND TRANSLATION LOOKASIDE BUFFER

BACKGROUND OF THE INVENTION

Field of the Invention

The present invention relates to the field of data processing. More particularly, the invention relates to a data processing apparatus having a cache and a translation lookaside buffer.

Description of the Prior Art

A data processing apparatus may have a cache for storing data. The cache provides more rapid access to a portion of the data stored in a memory. A data processing apparatus may also comprise a translation lookaside buffer (TLB) for translating between virtual addresses specified by the processor and physical addresses used by the cache and/or memory. If the cache is a physically indexed or physically tagged cache, then an address translation is required using the TLB before a cache access can be made. Even if the cache is virtually indexed and virtually tagged, a TLB translation may still be required to access memory.

The present technique seeks to improve the energy efficiency of performing cache accesses in a system having a translation lookaside buffer.

SUMMARY OF THE INVENTION

Viewed from one aspect the present invention provides a data processing apparatus comprising:

processing circuitry configured to process data;

a cache comprising a plurality of cache ways for storing data;

a translation lookaside buffer (TLB) configured to store a plurality of TLB entries each identifying a virtual-to-physical address mapping for an associated page of memory locations; and a way table configured to store a plurality of way table entries, each way table entry corresponding to one of said plurality of TLB entries; wherein:

each way table entry includes way information for identifying, for each memory location of the page associated with the corresponding TLB entry, which of said cache ways of said cache, if any, stores data associated with the memory location; and in response to a data access request from said processing circuitry for target data corresponding to a target virtual address, said TLB is configured to access a target TLB entry corresponding to said target virtual address and said way table is configured to access the way table entry corresponding to said target TLB entry, and said cache is configured to perform a cache access in dependence on the way information included in said corresponding way table entry for the memory location associated with the target data.

A cache may have a plurality of cache ways for storing data. For example, a set-associative cache may store data associated with a particular memory location in a corresponding location in any of the cache ways. When a cache access is made, the cache determines which of the ways is storing the required data. To assist with this, a way table may be provided for storing way table entries including way information, each piece of way information identifying which cache way stores data associated with a given memory location. Hence, the cache can know in advance of performing a cache lookup which way will store the required data, and so can perform a more efficient cache access in dependence on the way information.

The way table is coupled to a translation lookaside buffer (TLB) for storing virtual-to-physical address mappings. Each way table entry of the way table may correspond to one of the TLB entries of the TLB. The way information included in each way table entry may identify, for each memory location of the page associated with the corresponding TLB entry, which cache way, if any, stores the data associated with that memory location. By grouping the way information into entries corresponding to pages of memory, and coupling each way table entry with a corresponding TLB entry, searching of the way table and TLB becomes more efficient, since a single table search based on a target virtual address can identify both a target TLB entry and a corresponding way table entry. Hence, there is no need for separate address searching in both the TLB and the way table to locate the required entries. Since searching a table for a particular value consumes energy, the present technique enables the TLB and way table to be implemented in a more energy efficient way by reusing the searching already required for the TLB to also identify the correct way table entry.

Also, it is common for several consecutive data access requests to target data associated with the same page of memory. By grouping way information into way table entries each associated with a corresponding page of memory, such data access requests can be handled using a single way table entry, avoiding the need to perform multiple way table accesses. This also improves the efficiency with which the way information is accessed.

Each cache location of the cache may have corresponding tag data for identifying a portion of the memory address associated with the data stored in the cache location. The tag data can be used to determine which of the cache ways stores a desired data value.

If, in response to a data access request, the way information included in the relevant way table entry for the requested address indicates which cache way stores the target data, then the cache may access the target data from the cache way indicated in the way information, without accessing the tag data. By avoiding the need to look up tag data, energy consumption can be reduced.

Also, if the way information indicates which cache way stores the target data, then it is not necessary to access the other cache ways not indicated in the way information. Hence, energy consumption can further be reduced by not accessing such cache ways which do not contain the target data.

It is possible that the way information may not identify which way stores the target data. For example, the way table may only have a finite number of table entries, and so if the way table is already full when a new entry is required, a previous entry may need to be evicted, even though the cache still contains data corresponding to an address within the page associated with the evicted entry. If a data access request is issued targeting a memory location within the page corresponding to the evicted way table entry, and the way table entry is brought back into the way table, the way table may not identify which cache way stores the target data.

Therefore, in the case that the way information for the target data does not indicate which cache stores the target data, the cache may access data from each cache way in parallel, and may determine from the tag data whether any of the accessed data corresponds to the target data. Hence, even though the way table is provided to identify which cache way stores the data, the tag data is still useful to handle situations where the way information does not indicate which way stores the required data.

To ensure that the way information in the way table accurately reflects the status of the cache, the way information may be updated in response to changes in the allocation of cached data. In response to data being allocated to the cache, the cache may control the way table to update the way information corresponding to the associated memory location to indicate which cache way stores the data. Hence, on a subsequent cache access to that data, the cache can determine based on the way information which way stores the data.

In addition to way information identifying which cache way stores the corresponding data, each way table entry may also include validity information for identifying, for each memory location of the page associated with the corresponding TLB entry, whether data associated with that memory location is stored in the cache. The validity information can be used by the cache to determine whether to take account of the corresponding way information when performing in a cache access.

When data associated with a memory location is allocated to the cache, then the cache may control the way table to update the validity information corresponding to that memory location to indicate that the data is stored in the cache. On the other hand, when data associated with memory location is evicted from the cache, then the cache may control the way table to update the validity information corresponding to that memory location to indicate that the data is not stored in the cache. It is not necessary to update the corresponding way information on a cache eviction, since the updated validity information now indicates that the data is not stored in the cache and so the way information for that memory location should be ignored.

The way information and validity information can be represented in different ways for each memory location of the page corresponding to a way table entry. In some embodiments, the way information and validity information may be indicated separately for each memory location within the corresponding page. In other embodiments, a combined validity/way information value may be provided for each memory location. In other embodiments, way information may be set jointly for a group of memory locations such that data from each location in the same group must be placed in the same way of the cache.

Optionally, the validity information may also be used to predict whether data will be in the cache or not. If the validity information can be ensured to be correct, then if the validity information indicates that the data is not stored in the cache, this shows that a cache access would result in a cache miss, and so data can be fetched from a lower level cache or a memory without accessing the cache itself. To ensure that validity information is correct even if the corresponding way table entry is evicted from the way table, storage may be provided to buffer evicted way table entries until they are returned to the way table.

The present technique may be used with systems having a virtually tagged cache. Although the virtual-to-physical address mapping provided by the TLB is not essential for performing a cache access to a virtually tagged cache, the TLB may nevertheless perform address translation for other reasons, for example in case a memory access is required. Therefore, in such a system the way table can take advantage of the fact that TLB translations are being performed and reuse the searching of the TLB as an index into the way table.

However, the present technique is particularly useful in systems having a physically tagged cache, in which the tag data identifies a portion of a physical address associated with the data stored in the corresponding cache location. In such a system, the translation performed by the TLB is required for accessing the cache since the cache uses the physical address, not the virtual address, to identify the addresses of the data stored in the cache. Hence, when a cache access is required, a TLB translation will already be performed using the target TLB entry, and so the searching of the TLB based on the virtual address can be reused to also identify the corresponding way table entry without a further search of the way table.

The TLB would typically comprise a content addressable memory comprising a number of entries, each entry storing mapping between a virtual address and a physical address. Typically, a TLB would be searchable by the virtual address. However, the present technique recognises that it is useful to modify the TLB so that it can also be searched by the physical address. This is because with a physically tagged cache, the cache would identify data using a portion of the physical address. When a way table entry is to be updated in response to a cache allocation or cache eviction, the cache would therefore provide a portion of the physical address of the allocated or evicted data to the TLB and way table. By modifying the TLB to be searchable by physical address, this allows the way table entry to be identified by a search of the TLB.

As mentioned above, due to the finite capacity of the way table, it is possible for the way table entries to be evicted from the way table to make room for other way table entries. When an evicted way table entry is loaded back into the way table at a later stage, then it may not indicate any validity or way information, even though the corresponding data in the cache may have remained within the cache. Hence, if the corresponding way information is not updated later, a subsequent access to the data would require a full cache access using all cache ways and the tag array to identify which way is storing the data. Although this incurs an energy consumption penalty in comparison to a reduced access using way information, this is not a significant problem, since the number of way table entries which are evicted and then required again at a later time before the corresponding cache data is evicted is reasonably low. Therefore, it is not essential to provide a mechanism for updating the way information of an entry which has been restored to the way table without the corresponding cached data being allocated or evicted.

However, to increase the percentage of cache accesses which can use way information to improve energy efficiency, an update mechanism may be provided for updating way table entries in this scenario. Therefore, if on servicing a data access request, it is determined that the way information for the desired data does not indicate which cache way stores the target data (a "way table miss"), but the cache determines from the tag data that the data accessed from one of the cache ways does correspond to the target data (a "cache hit"), then the cache may control the way table to update the way information to identify the cache way storing the target data. In this way, even if a way table entry has been evicted from the way table and is later placed back in the way table, the way table information for each memory location can be recreated when another cache access accesses the data corresponding to that location. Hence, while there will be an initial energy penalty when a full cache access and way table update are required, any further accesses to data associated with the memory location for which the way information has been updated will be able to use the updated way information so that energy consumption can be reduced by accessing only the target cache way.

When updating way information in response to a way table miss and cache hit, the way table would need to identify which way table entry should be updated. Searching the TLB or way table to identify the correct way table entry to update can be energy intensive. To reduce the energy consumed in performing the update, the way table may be provided with a storage element which stores a way table entry identifier identifying a most recently accessed way table entry. If the way information needs to be updated in response to a way table miss and cache hit, then the way table can identify the entry to be updated from the way table entry without performing a full table search. This improves the energy efficiency of the update.

The TLB may be one of a hierarchy of TLBs. For example, the TLB may be a first-level TLB and the apparatus may comprise at least one further-level TLB. Typically, the first-level TLB is relatively small and can be accessed quickly and energy efficiently, while the further-level TLB is larger and can store more entries, but consumes more energy and has a greater latency in accessing a TLB entry, since the larger structure typically requires an increased number of transistors to be activated in order to access an entry. In response to a data access request for target data corresponding to a target virtual address, the first-level TLB may look up a target TLB entry corresponding to the target virtual address. If the first-level stores the target TLB entry, then the translation can be performed quickly and with little energy overhead. However, if the first-level TLB does not store the target TLB entry, then the target TLB entry may be accessed from the further-level TLB and the first-level TLB may be updated to store the target TLB entry. This hierarchy of TLBs is similar to a multi-level cache hierarchy.

A way table may be provided for at least the first-level TLB. Hence, each TLB entry of the first-level TLB may have a corresponding way table entry in the way table. It is not essential for any further-level TLBs to have corresponding way table entries. If a TLB entry is not present in the first-level TLB, then it would need to be fetched from a lower level. Providing at least one further-level TLB can greatly reduce the latency associated with fetching a TLB entry into the first-level TLB, since this avoids the need to fetch a page entry from a page table of memory. In contrast, if a required way table entry is not present in the way table, the penalty associated with the way table miss is much less than the penalty associated with a TLB miss. Unlike the TLB entries, for which the virtual-to-physical address mapping would be determined by referring to a lower-level TLB entry or a page table entry, the way information of the way table can be reconstructed from scratch because when a cache access is made, the way information can be updated in response to the way table miss and cache hit scenario as discussed above. Therefore, it is more important to provide further-level TLBs than further-level way tables, and so to save on circuit area and power consumption, it may be enough to provide a first-level way table corresponding to the first-level TLB, but not to provide further-level way tables corresponding to further-level TLBs.

On the other hand, to improve the coverage of the way table information, and reduce the likelihood of needing to update way information in response to the way table miss/cache hit scenario, the way table may also be provided in a multi-level hierarchy with at least one further-level way table corresponding to the at least further-level TLB. Hence, when the way table entry corresponding to the target TLB entry is not found in the first-level way table, it can be accessed from the further-level way table. The first-level way table may also be updated with the newly accessed entry. By providing a multi-level hierarchy of TLB and way table, a better balance between quick energy-efficient access and increased way table coverage can be achieved. The entries required frequently can be stored in the first-level TLB and way table to enable quicker access in a more energy efficient way, while the further-level TLB and further-level way table can be provided as a backup store to allow storage of a greater number of less frequently used entries.

The first-level TLB and first-level way table may also be referred to as a "micro-TLB" and "micro-way table" and the further-level TLB and further-level way table may be referred to simply as a TLB and way table, or as a "lower-level" TLB and way table.

The TLB and way table may be arranged in different ways. In one embodiment, the TLB and way table may be stored separately by the data processing apparatus. For example, separate memories may be used. In this case, to access the way table, the TLB may locate the target TLB entry, and may provide an index to the way table identifying the way table entry which corresponds to the target TLB entry. Alternatively, the way table may be searched for the required way table entry and may provide the TLB with an identifier of the target TLB entry. Hence, even if the way table and TLB are provided separately, a single search of the TLB or the way table is enough to locate the relevant entries in both tables without further searching of the other table.

Alternatively, the TLB and the way table may comprise a common memory which stores a plurality of entries. Each entry may have a portion corresponding to a TLB entry and another portion corresponding to a way table entry. In this case, the common memory may simply search for the corresponding entry based on the virtual address of the data access request, and may return both the mapped physical address of the corresponding TLB entry and the way information of the corresponding way table entry.

Viewed from a further aspect, the present invention provides a data processing apparatus comprising:

processing means for processing data;

a cache means for storing data, said cache means comprising a plurality of cache ways;

translation lookaside buffer (TLB) means for storing a plurality of TLB entries each identifying a virtual-to-physical address mapping for an associated page of memory locations; and way table means for storing a plurality of way table entries, each way table entry corresponding to one of said plurality of TLB entries; wherein:

each way table entry includes way information for identifying, for each memory location of the page associated with the corresponding TLB entry, which of said cache ways of said cache means, if any, stores data associated with the memory location; and in response to a data access request from said processing means for target data corresponding to a target virtual address, said TLB means is configured to access a target TLB entry corresponding to said target virtual address and said way table means is configured to access the way table entry corresponding to said target TLB entry, and said cache means is configured to perform a cache access in dependence on the way information included in said corresponding way table entry for the memory location associated with the target data.

Viewed from another aspect, the present invention provides a method for a data processing apparatus comprising a cache comprising a plurality of cache ways for storing data, a translation lookaside buffer (TLB) configured to store a plurality of TLB entries each identifying a virtual-to-physical address mapping for an associated page of memory locations, and a way table configured to store a plurality of way table entries, each way table entry corresponding to one of said plurality of TLB entries, wherein each way table entry includes way information for identifying, for each memory location of the page associated with the corresponding TLB entry, which of said cache ways of said cache, if any, stores data associated with the memory location;

said method comprising:

in response to a data access request for target data corresponding to a target virtual address, said TLB accessing a target TLB entry corresponding to said target virtual address, and said way table accessing the way table entry corresponding to said target TLB entry; and said cache performing a cache access in dependence on the way information included in said corresponding way table entry for the memory location associated with the target data.

Viewed from yet another aspect, the present invention provides a data processing apparatus comprising:

processing circuitry configured to issue access requests for data;

a cache configured to provide access to data in response to said access requests;

a translation lookaside buffer (TLB) configured to translate between virtual page addresses specified in said access requests and physical page addresses used by said cache;

an input buffer configured to buffer pending access requests issued by said processing circuitry; and an arbiter configured to select which of said pending access requests from said input buffer should be serviced by said cache in each processing cycle; wherein:

said cache is capable of servicing M access requests in the same processing cycle, where M is an integer, and said arbiter is configured to select said pending access requests to ensure that the selected pending access requests specify a maximum of N different virtual page addresses, where N is an integer and N<M.

Another way in which the efficiency of cache accesses can be improved in a system having a translation lookaside buffer relates to the way in which the cache services multiple access requests in the same processing cycle. A cache may be capable of servicing M access request in the same processing cycle, where M is an integer greater than one. For example, some caches may be banked so that each bank can independently service cache request at the same time.

There may be more access requests pending than can be serviced by the cache in a given cycle. Hence, the present technique provides an input buffer for buffering the pending access requests between processing cycles, and an arbiter for selecting which of the pending access request should be serviced by the cache in each processing cycle. The arbiter is arranged to select the pending access requests to ensure that the requests selected for servicing by the cache specify a maximum of N different virtual page addresses, where N is an integer less than M. The virtual page address is the portion of the virtual address which is the same for all addresses that share the same virtual-to-physical address mapping—i.e. addresses sharing the same virtual page address can be translated using the same TLB entry of the TLB.

It may seem counter intuitive to limit the number of different virtual page addresses that can be serviced in the same cycle to less than the total number of access requests which can be processed by the cache in the same processing cycle. One would expect that this could lead to the situation in which the capability of the cache is not fully used because some requests using different virtual page address are prevented from being selected. However, the present technique recognises that it is reasonably common for the processing circuitry to issue several pending access requests in close proximity to one another, each targeting the same virtual page address. For example, many program applications require successive accesses to the same data or to data associated with neighbouring addresses within the same page. Hence, it is common for the access requests pending during a given cycle to target a relatively limited set of different virtual page addresses.

The present technique recognises that, by limiting the number of different virtual page addresses which can be handled within the same cycle, elements of the system such as the translation lookaside buffer (TLB) and the arbiter can be implemented more efficiently. If the cache had to service access requests targeting many different virtual page addresses in the same cycle, then the TLB would need to perform many address translations in the same cycle, using multiple different TLB entries, and this would be costly in terms of energy consumption. The translation lookaside buffer may have a number of ports for receiving virtual page addresses for translation. Also, the arbiter or the cache may have comparators for comparing physical page addresses for data access requests. If many different page addresses are required to be handled in the same cycle, then many such TLB ports and comparators would need to be provided. Each port and comparator would suffer from both dynamic and static leakage, increasing the energy consumption of the data processing apparatus.

Therefore, by limiting the number of different virtual page addresses which can be handled in the same processing cycle, an overall improvement in efficiency can be achieved because even if there is a slight decrease in performance because some access requests may have to wait for an additional cycle, this is rare and the reduction in energy consumption achieved by reducing the complexity of the TLB, the arbiter and the cache more than compensates for this.

The TLB may be capable of translating N different virtual page addresses in the same processing cycle. Hence, the TLB need not have circuitry for translating all M access requests which can be serviced by the cache. For example, the number of ports which the TLB has for receiving virtual page addressing, and the number of table lookups required, can be reduced in order to reduce static and dynamic leakage in the system.

When selecting the access request, to be serviced by the cache, the arbiter may select as candidate access requests those pending access requests which specify one of the N different virtual page addresses. The arbiter may then select among the candidate access requests to determine which requests should actually be serviced by the cache.

In one embodiment, N=2, so that in each cycle the cache may only handle pending access requests which specify a maximum of two different virtual page addresses between them. This can be useful because there may be some operations, such as a mem-copy operation, which require data to be read from a first memory location and then written to a second memory location. Such an operation often requires two different page addresses, one associated with the first memory location and another associated with the second memory location. By enabling access requests specifying two different page addresses to be handled in the same cycle, such copy operations can be performed more efficiently. Nevertheless, by limiting the number of different page addresses which can be handled simultaneously to two, the TLB, arbiter and cache can be implemented in a more energy-efficient way.

However, in many embodiments it is enough for N=1, so that in each cycle, all the pending access requests selected for servicing by the cache specify the same virtual page address. While it may seem counter intuitive that this would be desirable, in practice many access requests in the same cycle access the same page and so this does not represent a significant loss in performance. By allowing only a single virtual page address to be used in the same cycle, the TLB only needs to perform one address translation per cycle, and any comparators for comparing physical page addresses in the arbiter or the cache can assume that all pending requests to be serviced in that cycle have the same page address. This is useful because this means that fewer address bits of the memory address need to be compared to identify the required data, since it can be assumed that the address bits corresponding to the page address will be the same for each request. Hence, limiting the system to a single page address per cycle provides a more efficient system for accessing the cache.

To ensure that all the access requests serviced in the same cycle target the same virtual page address, the arbiter may perform a comparison operation between the different pending access requests. For example, in each processing cycle, one of the pending requests may be selected as a primary access request, and the virtual page address of the primary access request may be translated by the TLB. Only other access requests specifying the same virtual page address as the primary access request may be candidates for being serviced by the cache in that cycle, and the arbiter may select among these candidates to determine which requests should actually be serviced. In a following cycle, a different request may be selected as the primary request and so a different page address may be handled.

The primary access request may be any of the pending access requests in the input buffer. For example, the primary access request may be the oldest of the pending access requests. In this way, the likelihood of a pending access request remaining stuck in the input buffer indefinitely is reduced. Alternatively, each access request may have a priority assigned to it and the primary access request may be the one of the requests having the highest priority. Also, the access request may have different types and some types may be prioritised ahead of other types, so that the primary access request may be one of the access requests having an access type of the highest priority.

If there is more than one virtual page address which is allowed to be processed in the same cycle (i.e. N=2 or more), then the arbiter may perform similar comparisons for each other virtual page address which is being processed in the same cycle.

If there are multiple candidate access requests which target data stored in the same cache line of the cache, then the arbiter may merge the multiple access requests, and the cache may service a single merged request corresponding to the combined data which be written or read if each individual request was handled in turn. This enables more of the pending requests to be serviced in the same cycle.

The arbiter may limit the number of requests which can be merged into a single request. For example, if the input buffer an buffer X pending access requests, the arbiter may merge from maximum of Y candidate access requests where X and Y are integers and Y<X. The case where Y<X is useful because the circuitry for comparing the addresses associated with each request in order to determine whether the requests access the same cache line incurs a small area and power consumption cost. It may be unlikely that all X pending requests access the same cache line. Therefore, to save on an area and power consumption, the number of candidate access request which can be merged can be limited to Y.

The cache may be banked so that there are M banks of cacheline for storing data and each bank is accessible independently from other banks. This means that the cache can service up to M access requests directed to different banks in the same processing cycle. In this case, then having selected the candidate requests which specify one of the N different virtual page addresses allowed for a given cycle, the arbiter may then determine whether that there are any bank candidate access requests targeting each bank.

For each bank that does have at least one bank candidate access request, the arbiter may select one of the bank candidate access requests as a first bank candidate access request, and determine if there are one or more other bank candidate access requests targeting the same cache line as the first bank candidate access request. If there are other bank candidate access requests targeting the same cache line, these requests may be merged with the first bank candidate access request and the merged request selected for servicing by that bank of the cache. Otherwise, the first bank candidate access requests may be selected for servicing. This technique enables more efficient use of the cache and improved performance since multiple requests targeting the same cache line can be serviced in one cycle while cache accesses are spread out across the banks where possible to make use of the banked structure of the cache.

Again, the arbiter may select the first bank candidate access request as any of the candidate requests that are pending for that bank. For example, the first bank candidate access request may be one of:

the oldest bank candidate access request;
the bank candidate access request having a highest priority; and
the bank candidate access request having an access type of the highest priority.

Since the arbiter limits the number of virtual page addresses that can be handled in one cycle, there may be some pending access requests that cannot be handled in that cycle. To accommodate these requests, the input buffer may have storage circuitry which stores a pending access request which is not selected by the arbiter in a current processing cycle, so that it is available for selection by the arbiter in a following processing cycle. Also, in the following processing cycle, the arbiter may be arranged to favour the old request from the storage circuitry over newer requests, to ensure forward progress of requests.

Viewed from another aspect, the present invention provides a data processing apparatus comprising:

processing means for issuing access requests for data;
cache means for providing access to data in response to said access requests;
translation lookaside buffer (TLB) means for translating between virtual page addresses specified in said access requests and physical page addresses used by said cache means;
input buffer means for buffering pending access requests issued by said processing means; and arbitration means for selecting which of said pending access requests from said input buffer should be serviced by said cache means in each processing cycle; wherein:

said cache means is capable of servicing M access requests in the same processing cycle, where M is an integer, and said arbitration means is configured to select said pending access requests to ensure that the selected pending access requests specify a maximum of N different virtual page addresses, where N is an integer and N<M.

Viewed from another aspect, the present invention provides a method for a data processing apparatus comprising processing circuitry configured to issue access requests for data; a cache configured to provide access to data in response to said access requests; and a translation lookaside buffer (TLB) configured to translate between virtual page addresses specified in said access requests and physical page addresses used by said cache;

said method comprising steps of:

buffering pending access requests issued by said processing circuitry in an input buffer; and selecting which of said pending access requests from said input buffer should be serviced by said cache in each processing cycle; wherein:

said cache is capable of servicing M access requests in the same processing cycle, where M is an integer, and said selecting step selects said pending access requests to ensure that the selected pending access requests specify a maximum of N different virtual page addresses, where N is an integer and N<M.

The above, and other objects, features and advantages of this invention will be apparent from the following detailed description of illustrative embodiments which is to be read in connection with the accompanying drawings.

DESCRIPTION OF THE EMBODIMENTS

Figure 1:
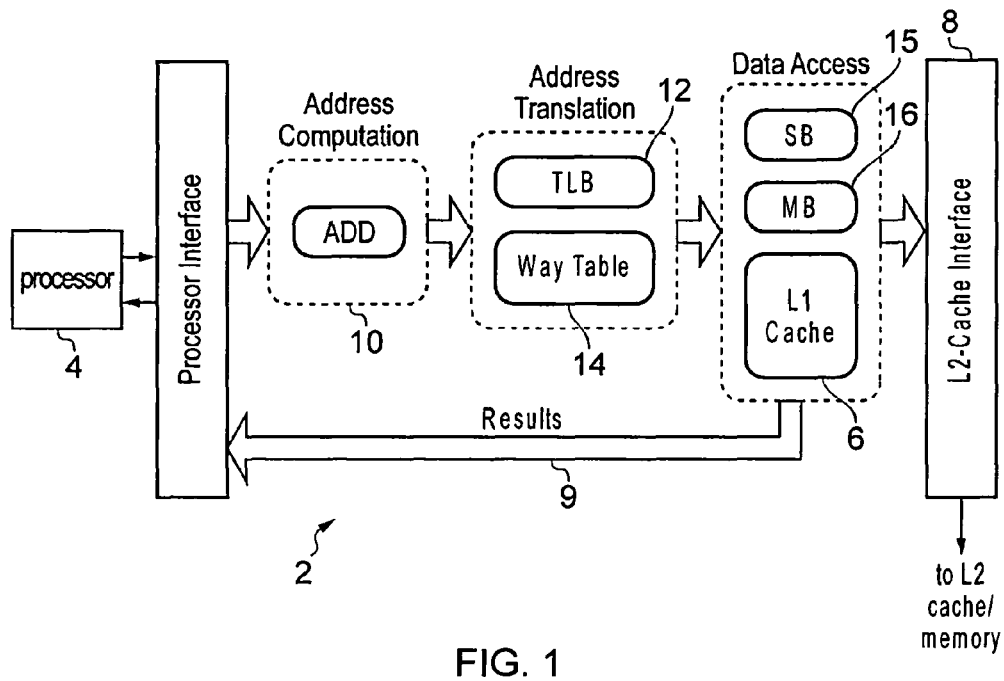
FIG. 1 schematically illustrates an example of a data processing apparatus having a translation lookaside buffer and a cache.

FIG. 1 schematically illustrates a data processing apparatus 2 comprising a processor 4 for processing data. A cache 6 is provided for storing data on behalf of the processor 4. The cache 6 is a level 1 (L1) cache which is a member of a cache hierarchy including at least one further level cache (the L2 cache). The L1 cache 6 communicates with the L2 cache and with a memory (not shown in FIG. 1) via an L2-cache interface 8. If data required by the processor 4 is not present in the L1 cache 6, then the L1 cache 6 requests the data from the L2 cache or the memory and allocates the data to a line of the cache 6. A cache coherency policy (e.g. write-back or write-through policy) may be used to maintain coherency of data in the L1 cache 6, L2 cache and memory. A bus 9 is provided for returning results of serviced cache accesses to the processor 4.

The processor 4 may issue data access requests for accessing data from the cache 6. An address computation stage 10 is provided for calculating a virtual address of the data required for a particular data access request. The L1 cache 6 in this example is a physically indexed, physically tagged (PIPT) cache, which uses physical addresses to identify the data stored in the cache. The L2 cache (and any further level caches that may be provided) and memory also use physical addresses. A translation lookaside buffer (TLB) 12 is provided to translate the virtual address calculated by the address computation stage 10 into the physical address used by the cache 6 and memory. A way table 14 is also provided corresponding to the TLB 12 for storing way information indicating which cache way of the cache 6 is storing required data. The way table will be described in more detail below.

The apparatus 2 also comprises a store buffer (SB) 15 and a merge buffer (MB) 16. The store buffer 15 is used for handling store requests which have been speculatively issued by the processor 4. To improve performance, a store request may be issued speculatively by the processor 4 before it is actually known whether the store request should be carried out. For example, in an out of order processor, or following a branch instruction, it may not be known whether the instruction associated with the store request is actually needed until a preceding instruction has completed, but to improve performance, the instruction can be executed in advance and then the result of the instruction may be committed only if it turns out that the instruction was actually required. Unlike load requests, store requests will change the architectural state of the cache and so it is not desirable to carry out a speculatively issued store request unless the store request is committed. Therefore, store requests issued speculatively may be placed in the store buffer 15 until it is known that the speculatively issued store request should actually be carried out. It will be appreciated that if the processor 4 does not permit speculative execution of instructions, then the store buffer 15 may be omitted.

When a store request is committed, it is sent to the merge buffer 16. If multiple committed store requests are pending corresponding to the same cache line of the cache 6, then to improve performance and avoid energy intensive memory accesses (e.g. to the L1 cache) the merge buffer 16 may merge these requests to form a single request which can be carried out by the cache 6 in one operation. The merged request in the merge buffer 16 is then serviced by the cache to write the merged data to the cache 6.

Figure 2:
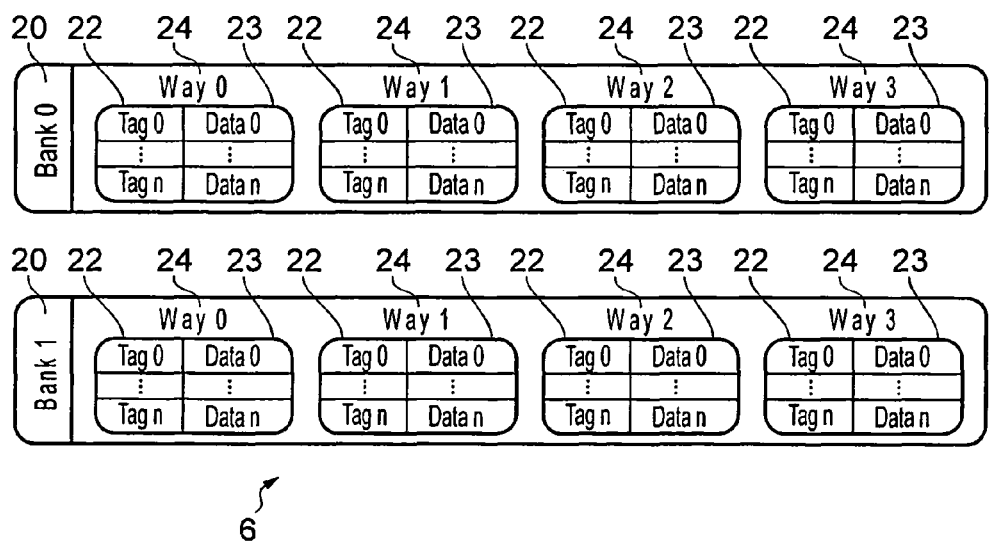
FIG. 2 is an example of a cache structure having banks and ways.

FIG. 2 illustrates an example of the structure of the cache 6. The cache 6 has several cache banks 20. Each bank 20 of the cache 6 may be accessed independently from other banks so that parallel accesses may be made to different banks within the processing cycle. However, for each bank, only one cache line can be accessed in one cycle. The cache 6 may determine from a portion of the memory address which bank 20 stores the corresponding data—for example with two banks the least significant bit may identify whether the data should be stored in bank 0 or bank 1.

The cache 6 is an n-way set-associative cache. This means that each cache bank provides n possible locations to store cache lines corresponding to one particular address, one in each cache way 24. In the example of FIG. 2, n=4, so that each bank has 4 cache ways 24, each cache way 24 including a number of cache lines comprising tag data 22 and data 23. The tag data 22 of the cache may be referred to collectively as a "tag array". For each cache line, the tag data 22 stores a portion of the memory address associated with the corresponding data 23, to allow the cache 6 to identify which data is stored in each cache line. Note that, while there are n possible locations in which a particular data value can be stored, the cache only holds one copy of the data value at a time, with the other (n−1) possible locations being available for storing other data values. It will be appreciated that the cache structure shown in FIG. 2 is merely an example, and that other arrangements are possible, such as a cache having n cache banks each representing one cache way. The present technique can be adapted accordingly for different cache structures.

Figure 4:
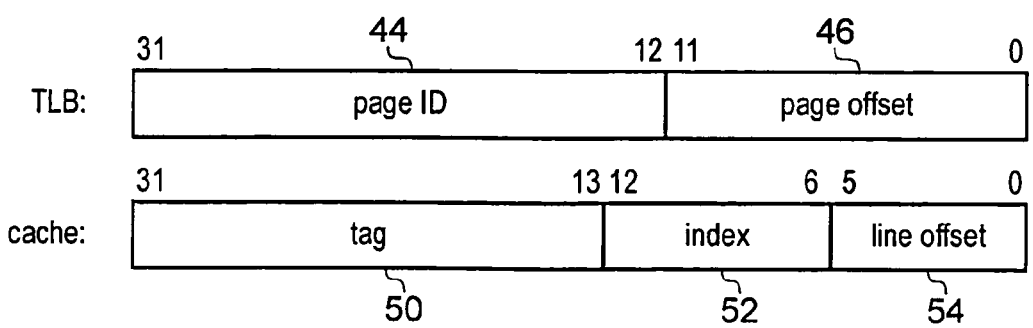
FIG. 4 shows an example of the way in which a memory address is interpreted during address translation and when used by the cache.

The lower part of FIG. 4 illustrates an example of how the memory address may be interpreted by the cache 6. The address comprises a tag portion 50, an index portion 52 and a line offset portion 54. The index portion 52 identifies the location within each of the cache ways 24 that may store the corresponding data value. When a data value is stored in the cache, the tag portion 50 of the corresponding address is stored as tag data 22 corresponding to the cache line storing the data. When accessing data from the cache, the tag portion 50 of a requested address may be compared with the tag data 22 for the cache lines in each way 24 that are identified by the index portion 52, and if there is a match, then the cache line corresponding to the matching tag portion stores the required data. If there is no tag match, then the data is not stored in the cache and so is requested from a lower level cache or from memory. The line offset portion 54 of the address identifies the position within the cache line at which the required data is stored.

Figure 3:
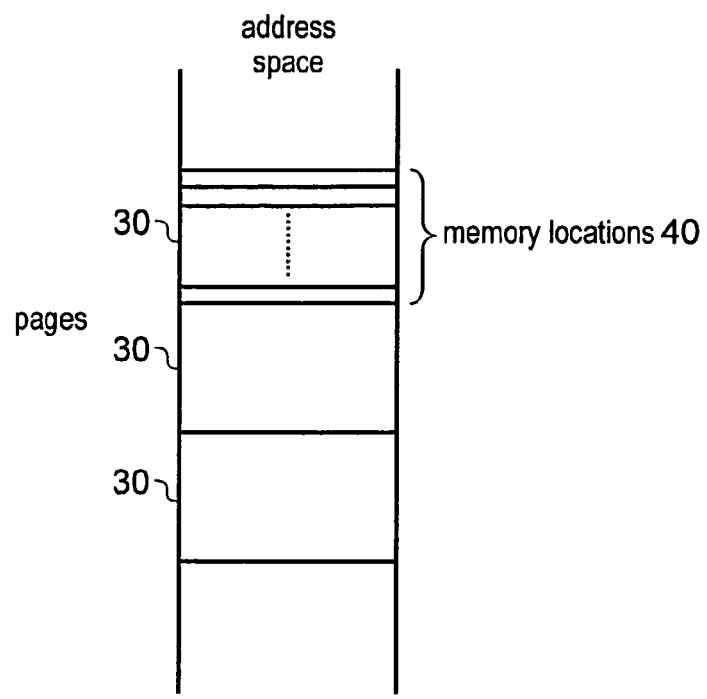
FIG. 3 shows an address space comprising pages, each page comprising a number of memory locations.

FIG. 3 shows an example of a memory address space divided into a number of pages 30, each page comprising a number of memory locations 40. The page 30 is the unit of memory locations for which a same virtual-to-physical address mapping is applied. The upper part of FIG. 4 shows an example of how a memory address may be interpreted by the TLB 12. Each memory address comprises a page ID portion 44 and a page offset portion 46. The page ID portion 44 identifies the page 30 of the address space containing the address. The page ID portion 44 may be different for a virtual address and its corresponding physical address. Hence, the TLB uses the page ID portion 44 to identify a corresponding TLB entry for translating the virtual page ID of the virtual address into a physical page ID of the corresponding physical address. On the other hand, the page offset portion 46 of the address identifies the particular memory location 40 within the page 30. The page offset portion 46 remains the same during the translation from a virtual address to a physical address by the TLB.

FIG. 4 shows a particular example in which the page size is 4 KB, and the cache 6 is a 4-way set-associative cache storing 32 KB of data in 64 byte wide cache lines. It will be appreciated that different page sizes and cache line sizes, and different numbers of cache ways, may be used. In this case, the number of bits of the page ID portion 44, page offset portion 46, tag portion 50, index portion 52 and line offset portion 54 may vary from the example shown in FIG. 4.

The cache 6 has two cache access modes: a standard cache access mode and reduced cache access mode. In the standard access mode, each of the data ways 24 is accessed and the tag data 22 is used to identify which of the data ways stores the required data, as described above.

The cache 6 also has a reduced cache access mode which can be used to save energy in comparison to the standard access mode. The way table 14 contains way information indicating which of the cache ways 24 stores the data associated with a given memory address. Hence, the way information can be used to identify the required data way 24, and so it is not necessary to access the other data ways 24 or the tag array 22.

Figure 5:
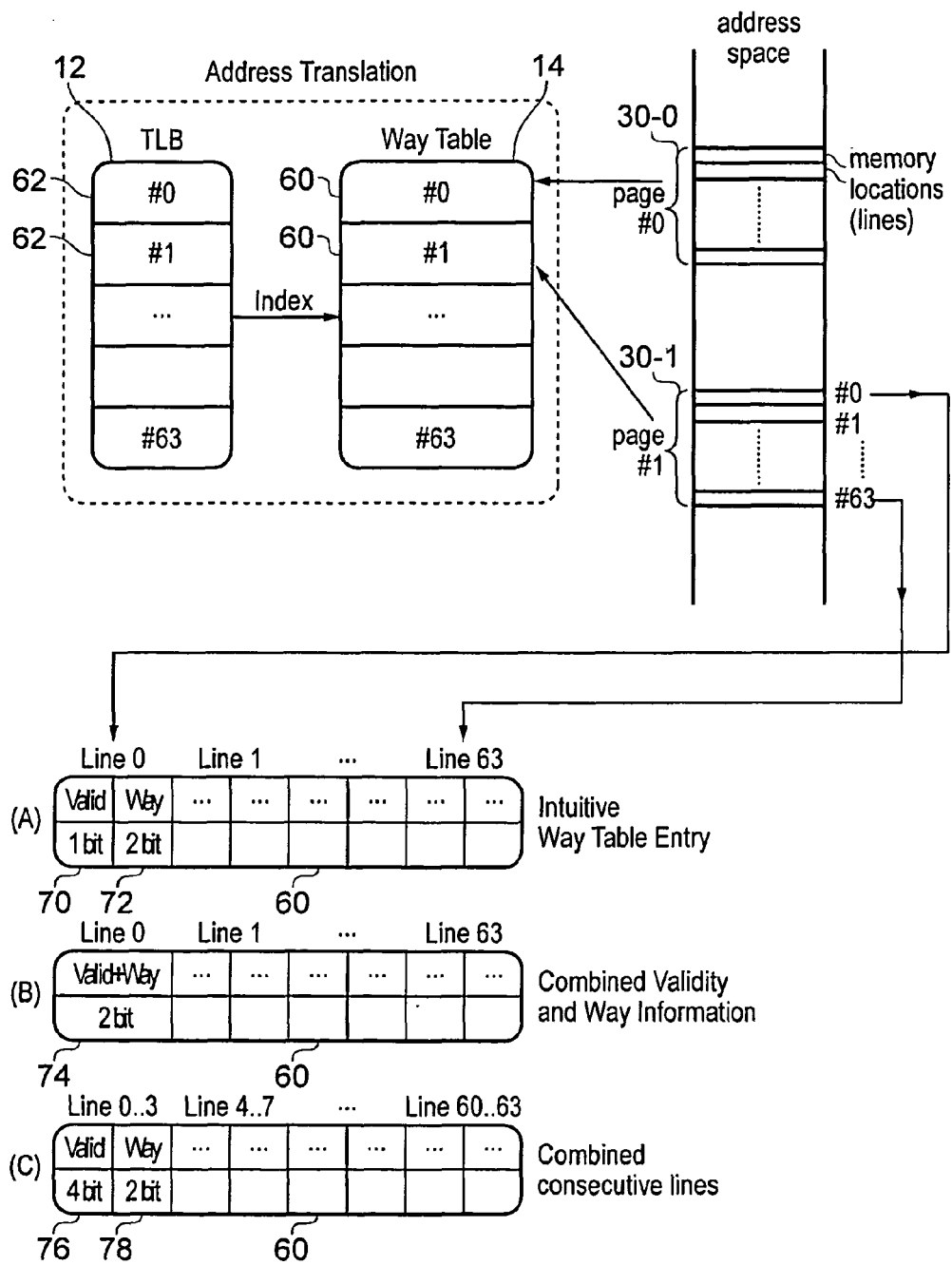
FIG. 5 illustrates the relationship between a TLB and a way table and several examples of representing way information and validity information in way table entries.

FIG. 5 shows the structure of the way table. The way table 14 has a number of way table entries 60. Each way table entry 60 corresponds to a corresponding TLB entry 62 in the TLB 12. Each TLB entry 62 indicates a virtual-to-physical address mapping for an associated page 30 of memory locations. For example, as shown in FIG. 5, TLB entry #0 indicates the virtual-to-physical address mapping for a first page 30-0 and TLB entry #1 indicates virtual-to-physical address mapping for an associated page 30-1.

Each way table entry 60 of the way table 14 stores way information for each memory location within the page associated with the corresponding TLB entry 62. The way information indicates which of the cache ways 24, if any, stores the data associated with the corresponding memory location. For example, the way table entry #0 identifies the way information for each of the memory locations within page 30-0, and the way table entry #1 identifies way information for each memory location within page 30-1. The size of the TLB 12 and way table 14 is finite and so only a subset of the pages may have corresponding way table entries 60 and TLB entries 62 at a given time. If a new TLB entry 62 and way table entry 60 is required for a given page, then an existing TLB entry 62 and way table entry 60 may be evicted to make way for the new entries.

The way table entries 60 also maintains validity information indicating whether or not the data associated with each memory location within the corresponding page is stored in the cache. FIG. 5 shows three examples of how the validity information and the way information may be represented within each way table entry 60.

In the first example (A), the way table entry 60 includes a valid field 70 and a way field 72 for each memory location (line) within the page 30 corresponding to that way table entry 60. In this example, the valid field 70 comprises a single bit which has a first value (e.g. a bit value of 1) if the data from the corresponding memory location is stored in the cache 6, and a second value (for example a bit value of 0) if the data from the corresponding memory location is not stored in the cache 6. The way field 72 comprises a 2-bit value indicating which of the four data ways 24 stores the data from the corresponding memory location. In the example (A), each data value may be placed in any of the four ways.

In the second example (B), the validity information and way information are combined into a single field 74 and the number of ways 24 in which data from a particular memory location may be placed is reduced by one. A 2-bit combined validity/way field 74 is provided for each memory location within the corresponding page 30. One of the four potential values for the combined field 74 (e.g. 0b00) is used to indicate that the data is not stored in the cache (i.e. the validity information). The other three potential values (e.g. 0b01, 0b10, 0b11) are allocated to three of the cache ways 24, to indicate that the data is stored in that cache way (i.e. the way information). The data associated with the corresponding memory location may therefore not be placed in the fourth of the cache ways not represented by the three potential values of the way information. This approach reduces the number of bits required for each way table entry compared to example (A), and since there are fewer bits, energy consumption per way table access is reduced. The impact of this approach on the cache miss rate is minimal because most threads executed by the processor 4 do not utilise all four ways of the L1 cache 6. Moreover, even with the way table representation in example (B), the cache may still be realised as a four-way set associative cache. In particular, a cache with four banks 20 may hold lines 0 to 3 in separate banks and lines 0, 4, 8, . . . , 60 in the same bank. By deeming way 0 invalid for the lines 0 to 3, way 1 invalid for lines 4 to 7 and so on, a conventional thread that exhibits some form of special locality will most likely perceive the cache to be 4-way set-associative.

FIG. 5 also shows a third example (C) of representing the way and validity information in each way table entry, in which validity and way information is grouped together for a number of consecutive memory locations (lines). For example, each group of four memory locations (0 . . . 3, 4 . . . 7, etc.) has a corresponding validity field 76 including a bit for each memory location in the group, identifying whether the data associated with that memory location is stored in the cache. Each group of memory locations also has a way field 78 comprising a 2-bit value identifying which of the 4 data ways 24 stores the data associated with the memory locations within that group. In this example, the cache 6 is restricted to storing the data associated with each memory location of the same group within the same cache way 24. This approach significantly reduces the number of bits required for each way table entry 60 and so reduces the energy consumption per way table access.

It will be appreciated that the examples shown in FIG. 5 are merely illustrative and that there are many different ways in which the validity information and way information may be represented within the way table entries. Whichever representation is used, by coupling the way table 14 with the TLB 12 as shown in FIG. 5, it is not necessary to search both the TLB 12 and the way table 14 for a corresponding entry when performing a cache access. Instead, for a given memory access request, one of the TLB 12 and way table 14 may be searched to identify the entry corresponding to the virtual address of the memory access request, and the other table may then be controlled to access the corresponding entry without performing a further search. For example, as shown in FIG. 5 the TLB 12 may search for a corresponding TLB entry 62 by matching the virtual page ID portion 44 of the requested virtual address with the virtual page ID within each TLB entry 62, and once the target TLB entry has been identified, the TLB may control the way table 14 to return the corresponding way table entry 60. By avoiding duplication of searching of the two tables 12, 14, energy consumption can be reduced.

In the example of FIG. 5 the TLB 12 and way table 14 are illustrated separately. For example, the TLB 12 and way table 14 may be provided as separate memories. When the TLB 12 has located the required TLB entry 62, the TLB 12 may provide an index value to the way table 14 which identifies the corresponding way table entry to be used for accessing the cache 6.

On the other hand, it is also possible to implement the TLB 12 and way table 14 as a common memory having a number of entries. Each entry of the common memory may comprise both the corresponding TLB entry 62 and the corresponding way table entry 60. In such an embodiment, the common memory would search for an entry having a virtual page ID 44 corresponding to the virtual page ID of the address for the current data access request, and would then return the physical page ID and the corresponding way and validity information from that common memory entry.

Figure 6:
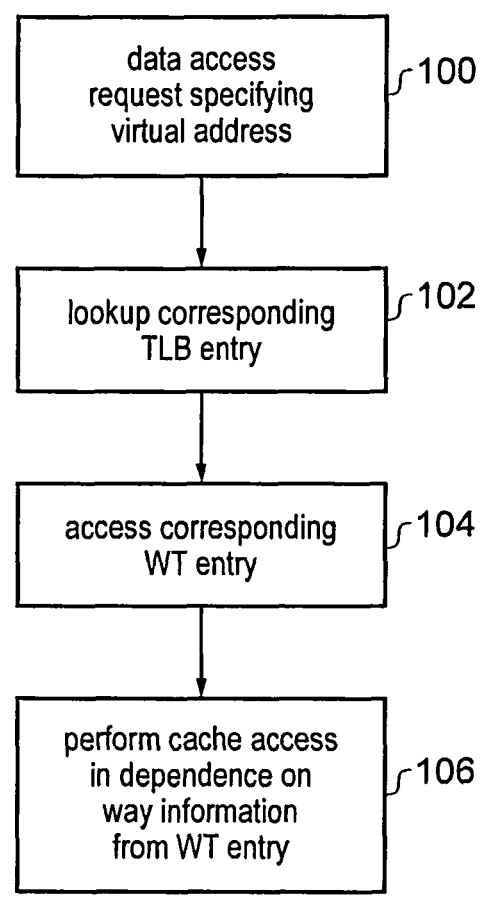
FIG. 6 illustrates a method of performing a cache access using way information stored in a way table.

FIG. 6 illustrates a method of performing a reduced cache access based on the information stored on the way table 14. At step 100, the processor 4 issues a data access request and the address computation stage 10 calculates a virtual address for the data access request. At step 102, the TLB 12 looks up the corresponding TLB entry (i.e. the TLB entry 12 for which the virtual page ID matches the virtual page ID 44 of the virtual address in the data access request). The TLB 12 returns a physical page ID 44 corresponding to the virtual page ID, as specified by the TLB entry. At step 104, the way table 14 accesses the way table entry 60 corresponding to the TLB entry 62 accessed by the TLB 12. At step 106, the cache 6 performs a cache access in dependence on the way information within the way table entry. If the validity information of the way table entry indicates that the data is stored in the cache, then the cache performs the reduced cache access in which only the cache way 24 indicated in the way information is accessed, without accessing the tag array 22 or the other cache ways 24. On the other hand, if validity information indicates that the data is not stored in the cache, then the cache performs the standard cache access in which all the data ways 24 are accessed and the tag array 22 is used to identify which data way 24, if any, stores the required data.

In this way, the way table allows a reduced cache access to be performed when possible, with the standard cache access being used when the way table does not provide the required information. As the standard access mode may still be required, the tag array 22 is still provided despite the fact that the tag array 22 is not necessary for the reduced access mode.

Figure 7:
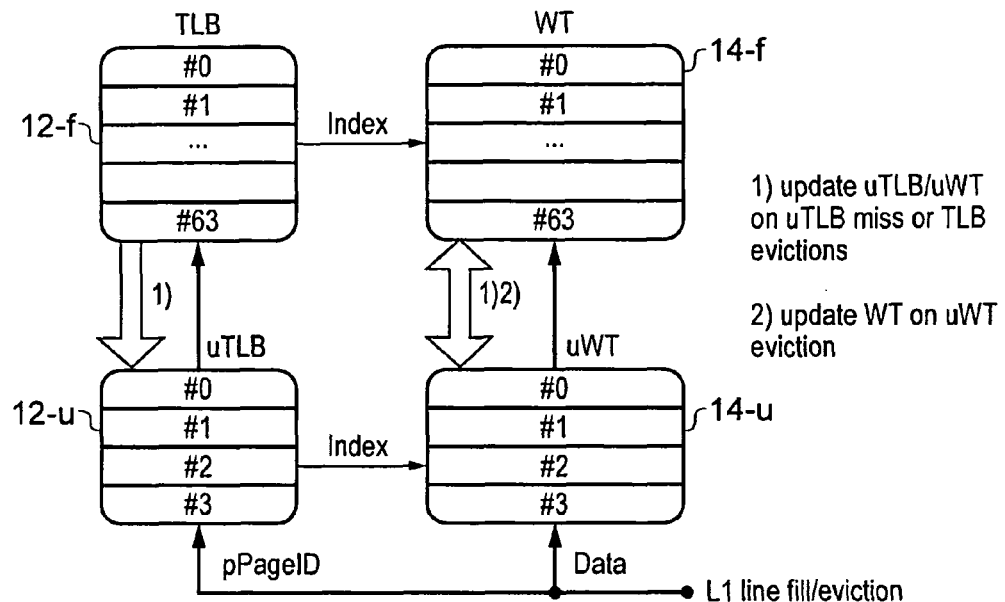
FIG. 7 shows a first example of updating way information stored in the way table.
Figure 8:
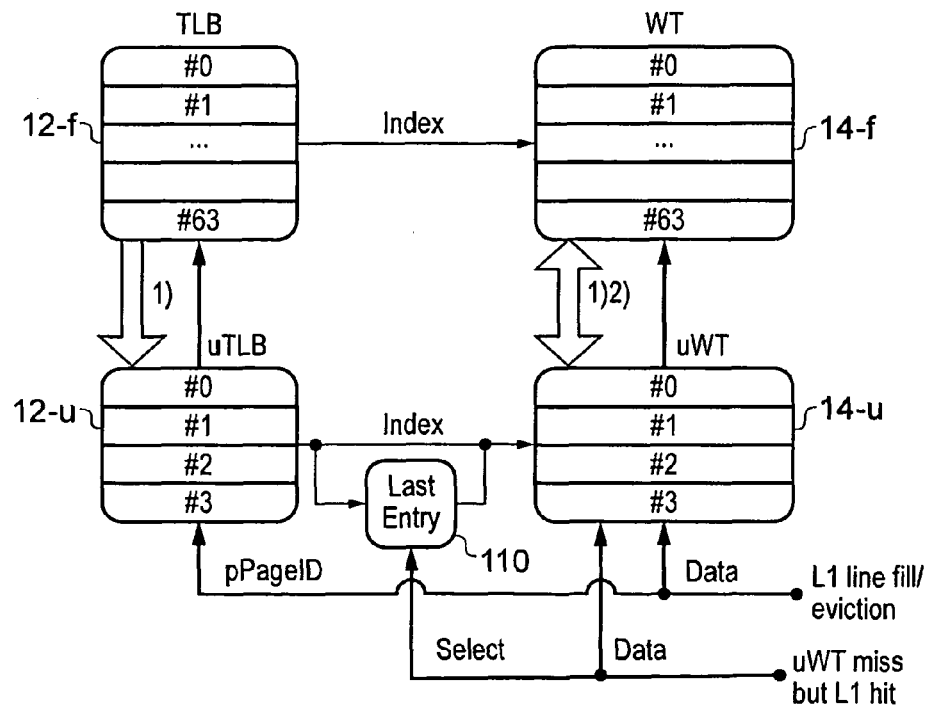
FIG. 8 shows another example of updating way information in the way table.

As shown in FIGS. 7 and 8, the TLB 12 and way table 14 may have a hierarchical structure comprising multiple levels of TLB and way table. The apparatus may comprise a micro-TLB (uTLB) 12-$u$ and a further-level TLB 12-$f$ and the way table may comprise a micro-way table (uWT) 14-$u$ and a further-level way table (WT) 14-$f$. The micro-TLB 12-$u$ and the micro-way table 14-$u$ are small, fast access, structures from which a TLB entry or way table entry can be retrieved quickly and energy efficiently compared to the further level TLB 12-$f$ or further-level way table 14-$f$. On the other hand, the further-level TLB and further-level way table allow a greater number of TLB entries and way table entries, but at an increased energy cost. Hence, if a data access request specifies an address corresponding to a page which does not have a corresponding micro-TLB entry and micro-way table entry, then the TLB and way table entries can be brought in to the micro-TLB and micro-way table from the further-level TLB/way table. If the micro-TLB 12-$u$ and micro-way table 14-$u$ are already full, then another entry (e.g. a least recently used entry or least recently allocated entry) can be evicted from each table. By providing such a hierarchical table structure, an improved balance between an energy efficiency, quick access and increased TLB/way table coverage can be achieved, in a similar way to a multi-level cache hierarchy.

In order to maintain the way table information, the way information is updated in response to operations which change the allocation of data in the cache 6. As shown in FIG. 7, the way information may be updated when data is allocated to a cache line of the cache 6 (an L1 line fill) or when data is evicted from the cache 6. When a cache linefill or cache eviction occurs, the cache 6 provides the physical address associated with the allocated or evicted data to the TLB 12 and way table 14. The TLB is searchable based on the physical page ID and identifies the TLB entry corresponding to the physical address identified by the cache 6. The TLB then controls the way table 14 to update the corresponding way table entry. The way table 14 identifies the way/validity field to be updated based on part of the page offset portion of the physical address provided by the cache 6.

On a cache linefill, the corresponding field of the way table entry 60 within the micro way table 14-$u$ or the way table 14-$f$ is updated so that the validity information now indicates that the information is stored in the cache and the way information now indicates which way stores the data. On the other hand, when data is evicted from the cache, then the validity information is updated to indicate that the data is no longer stored in the cache, to indicate that the way information corresponding to that memory location should not be used on a subsequent cache access.

If a micro-way table entry is updated, then the corresponding entry within the further-level way table 14-$f$ is not updated until the corresponding micro-way table entry is evicted from the micro-way table 14-$u$. Deferring the update of the further-level way table 14-$f$ saves energy, because even if the entry in the micro-way table 14-$u$ is updated multiple times before being evicted, the further-lever way table entry only needs to be updated once.

The capacity of the further-level TLB 12-$f$ and further-level way table 14-$f$ is finite and so these tables may not store entries corresponding to all pages of the address space.

Hence, when required an entry from the TLB or the way table can be evicted to make space for another entry corresponding to a different page. The corresponding TLB entry would be fetched from a page table associated with the memory, while a way table entry would be allocated to the way table which would initially be in a reset state in which the validity information indicates that the data associated with all the memory addresses within the corresponding page is not stored in the cache.

Therefore, it is possible that data stored in the cache may have its corresponding way table entry evicted from the further way table 14-$f$ even while the data remains in the cache. When the corresponding way table entry is brought back in to the way table 14-$f$, it will initially be a reset state even though the corresponding data is stored within the cache. Therefore, the cache 6 may not be able to assume that data, which the validity information indicates is not stored in the cache, is in fact not stored in the cache. Therefore, even when validity information indicates that the data is not stored in the cache, the cache would still perform a normal cache access using the tag array 22 to identify whether the data is actually stored in the cache. With the arrangement of FIG. 7, where the way information is only updated on a cache linefill or cache eviction, it would not be possible to update way information once it is brought back into the way table for data already present in the cache. This may not be a problem if cache accesses are relatively localised such that after accessing a particular value a few times, it is unlikely that the value will be required again (e.g. a streaming application may load data into the cache, reuse the data and then move onto using other data, and so the first loaded data may not be required again).

However, for other applications, it may be possible that cached data may be accessed at intervals over a period of time. In this case, it can be useful to use the update scheme shown in FIG. 8 in which, in addition to updating the way information on line fills and cache eviction as in FIG. 7, the way information is also updated when the corresponding way table entry indicates that the data required by a data access is not in the cache 6 (a "way table miss"), but on checking the tag array 22 it is found that the data is in the cache 6 (a "cache hit"). This scenario is likely to arise at the first access to each memory location of the page for which the corresponding way table entry has recently been restored to the way table 14. Hence, the cache may signal to the way table when a way table miss/cache hit is detected and may indicate which way actually stores the data. In response, the way table may update the corresponding way table entry so that the validity information now indicates that the data is stored in the cache and the way information now indicates which way stores the data. The same way table entry may need to be updated multiple times each time a way table miss/cache hit is detected for a different address within the page corresponding to that way table entry.

To identify which way table entry 14 should be updated in response to the way table miss/cache hit, the way table 14 or TLB 12 could perform a search based on the address of the data. However, this would consume extra energy. Therefore, to avoid having to perform a further search, the way table of FIG. 8 is provided with a storage element 110 which stores the index value of the most recently accessed way table entry. Therefore, when the cache signals that an update is required in response to a way table miss/cache hit, the way table 14 can simply update the entry which is indicated in the last entry storage element 110, without needing to search the table based on the address of the accessed data. The update based on the storage element 110 may only be required for the micro-way table 14-*u*, since on accessing an entry from the further-level way table 14-*f*, that entry may be allocated to the micro-way table 14-*u*, and the way information update can be performed more efficiently in the micro-way table 14-*u* than the further-level way table 14-*f*. The update of the corresponding further-level way table 14-*f* can be deferred until the entry is evicted from the micro-way table 14-*u*.

Optionally, the way table 14 may also be used to predict whether a L1 cache miss would occur for the desired data. If the validity information for a given memory address indicates that the corresponding data is not stored in the cache, then this could be interpreted as a L1 cache miss, and a L2 cache access or memory access could be initiated without needing to access any of the data ways 24 or tag array 22 of the L1 cache 6, freeing these data ways 24 and tag array 22 for use in servicing other cache accesses, or allowing the data ways 24 and tag array 22 to remain idle to save energy. However, this approach would require that the validity information is guaranteed to be correct. As discussed above, this may not be the case if way table entries are evicted from the way table 14 and then restored to the way table 14 at a later time while the corresponding data remains in the cache. To address this issue, evicted way table entries may be stored in a separate memory or in an additional further-level way table, or entries which have been restored to the way table in a reset state could be marked as an entry for which L1 cache miss prediction should not be performed. However, this would require additional circuitry for storing the evicted entries or the additional "miss prediction" bits, and the energy consumed by this additional circuitry may not be justified because most L1 caches exhibit very low miss rates and so the advantage of L1 miss prediction may not arise often. Therefore, miss prediction based on the validity information is optional.

Figure 9:
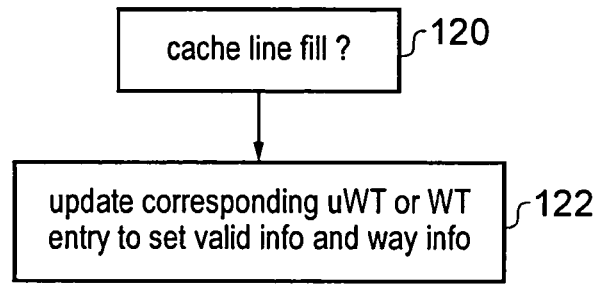
FIG. 9 illustrates a method of updating the way information in response to a cache linefill.
Figure 10:
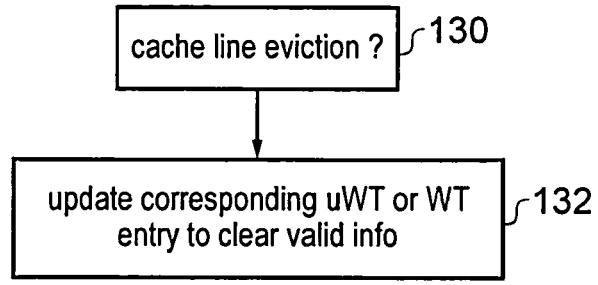
FIG. 10 illustrates a method of updating the way information in response to a cache line eviction.
Figure 11:
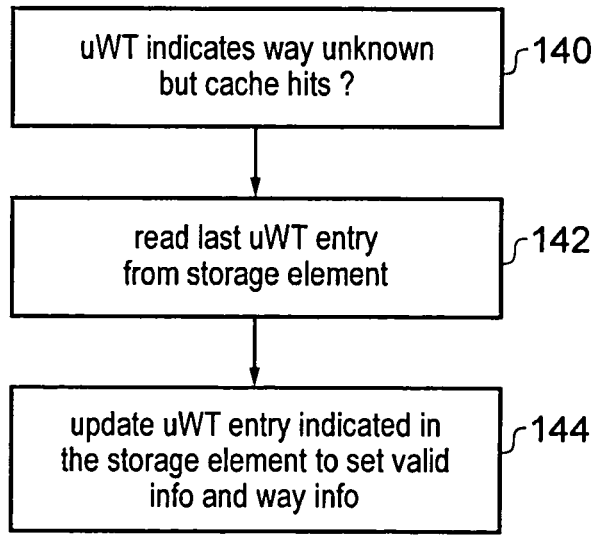
FIG. 11 illustrates a method of updating the way information when the way information is unknown but the corresponding data is found in the cache.

FIGS. 9 to 11 show methods of updating the way table entries based on the cache accesses. FIG. 9 shows the updating of the way table in response to a cache linefill. At step 120, a cache linefill is detected. The cache provides the physical address associated with the allocated data to the TLB 12 and way table 14, and also provides an indication of which cache way 24 has been allocated with the data. The TLB 12 or way table identifies the way table entry to be updated based on the physical page ID 44. At step 122, the way table 14 uses part of the page offset portion 46 of the address to identify the validity and way information fields of the way table entry corresponding to the data, updates the validity information to indicate that the data is stored in the cache and updates the way information to indicate which cache way 24 stores the data.

FIG. 10 shows a method of updating the way table in response to a cache line eviction. At step 130, data from a cache line is evicted from the cache and returned to a lower level of the memory hierarchy (e.g. L2 cache, L3 cache, or memory). The cache provides the physical address associated with the evicted data to the TLB 12 and way table 14. The TLB or way table uses the physical page ID 44 of the address to locate the way table entry to be updated. The way table 14 uses the page offset portion 46 of the address to locate the corresponding validity field within the way. At step 132, the way table 14 updates the validity field to indicate that the corresponding data is not stored in the cache.

FIG. 11 shows a method of updating the way table entry in response to a way table miss/cache hit. On detecting this scenario at step 140, the cache signals to the way table 14 that the way table entry needs to be updated, and identifies the way 24 storing the accessed data. At step 142, the index of the most recently accessed way table entry is read from the storage element 110. At step 144, the way table 14 updates the micro-way table entry indicated in the storage element, so that the validity information now indicates that the data is cached and the way information indicates the way storing the data. The corresponding way table entry in the further-level way table is not updated until the micro-way table entry is subsequently evicted from the micro-way table 14-*u*.

As will be discussed below, the cache 6 may service multiple requests directed to different banks within the same processing cycle. If so, then it may be necessary to update multiple fields within the same way table entry, or multiple way table entries, in the same processing cycle. Therefore, the methods of FIGS. 9 to 11 can be repeated for each information that is to be updated.

In summary, by providing a way table for storing way information, power consumption can be reduced by accessing only the way indicated in the way information and not accessing the other ways 24 or the tag array 22. By providing way table entries which group together way information corresponding to a page of memory, and linking each way table entry to a corresponding TLB entry, searching the TLB and way table becomes more efficient since a single search of one of these tables is enough to locate both the corresponding TLB entry and way table entries.

Figure 12:
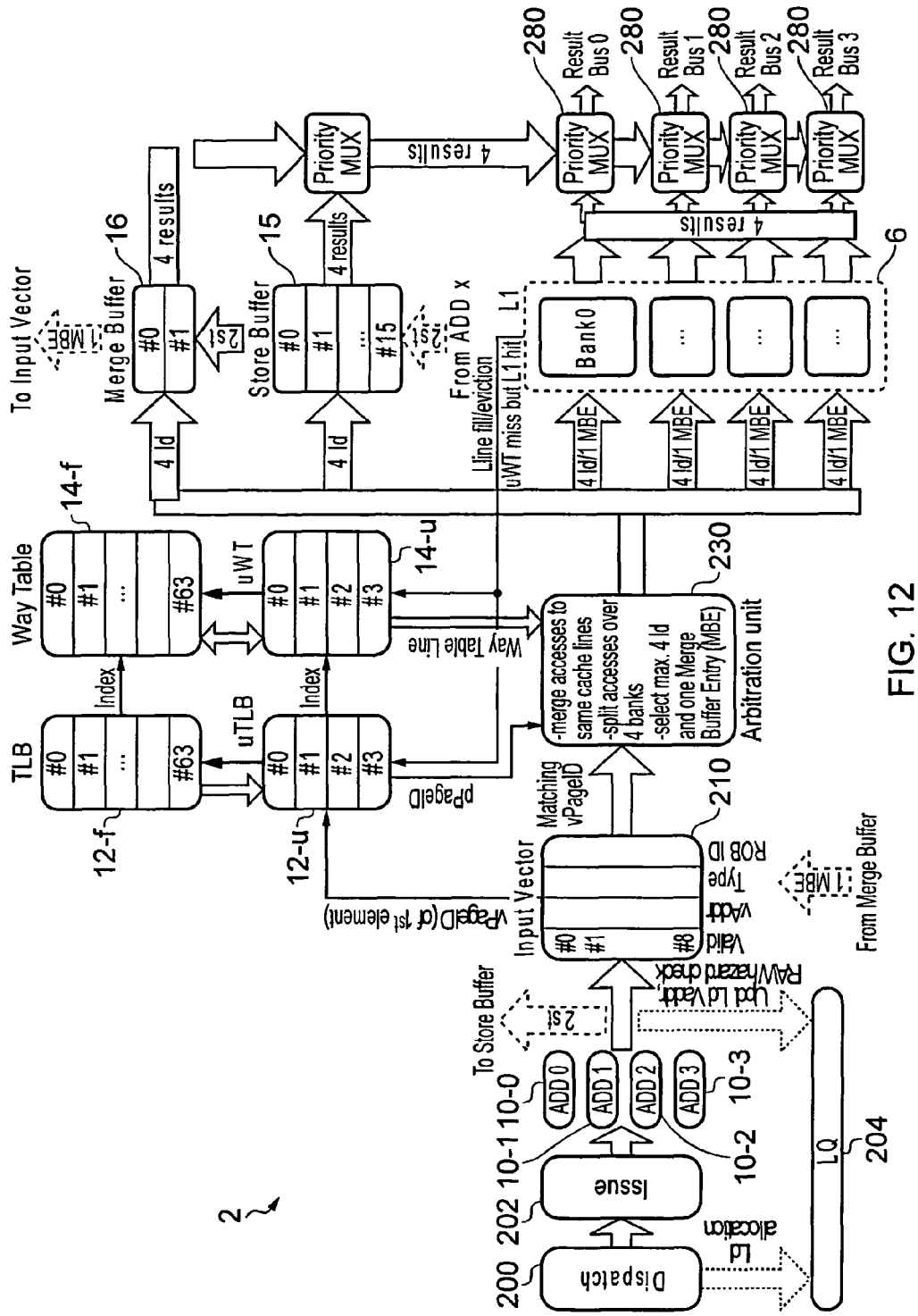
FIG. 12 shows another example of a data processing apparatus having a cache which can handle multiple accesses in the same cycle.

FIG. 12 illustrates the apparatus 2 in more detail, in particular showing the way in which the apparatus 2 may process multiple data access requests in parallel. Processor 4 has a dispatch stage 200 and an issue stage 202 for determining when to issue data access request to the cache 6. A load queue 204 may also be used to store pending load requests. The processor 4 comprises address calculation stages 10-0 to 10-3 for computing the virtual addresses associated with the data access requests issued by the processor 4.

An input vector 210 is provided for buffering pending requests which await servicing by the cache. An arbiter 230 is provided to select which of the pending requests indicated in the input vector 210 should be serviced in a given processing cycle. Load requests from address computation stages 10-0 to 10-3 are placed directly in the input vector 210 to await servicing by the cache. Meanwhile, speculatively issued store requests are sent to the store buffer 15 to await confirmation that the store requests are to be carried out. Once committed, the store requests are transferred to the merge buffer 16 to await servicing by the cache 6. The merge buffer 16 may merge multiple store requests from the store buffer 15 to form a merge buffer entry. Merge buffer entries are then provided to the input vector 210 to await selection by the arbiter 230.

Typically, the merge buffer 16 would defer sending merge buffer entries to the input vector 210 until it receives a new request and would otherwise overflow unless it issues a merge buffer entry to the input vector 210. That is, if the merge buffer 16 receives a store request from the store buffer 15 that addresses a region not represented by any current merge buffer entry, and there are no free merge buffer entries, then the merge buffer 16 would evict a current merge buffer entry and send it to the input vector 210. By delaying eviction of the merge buffer entry as long as possible, this increases the probability that multiple store requests can be merged and processed in the same cycle, therefore making more efficient use of the cache.

Figure 13:
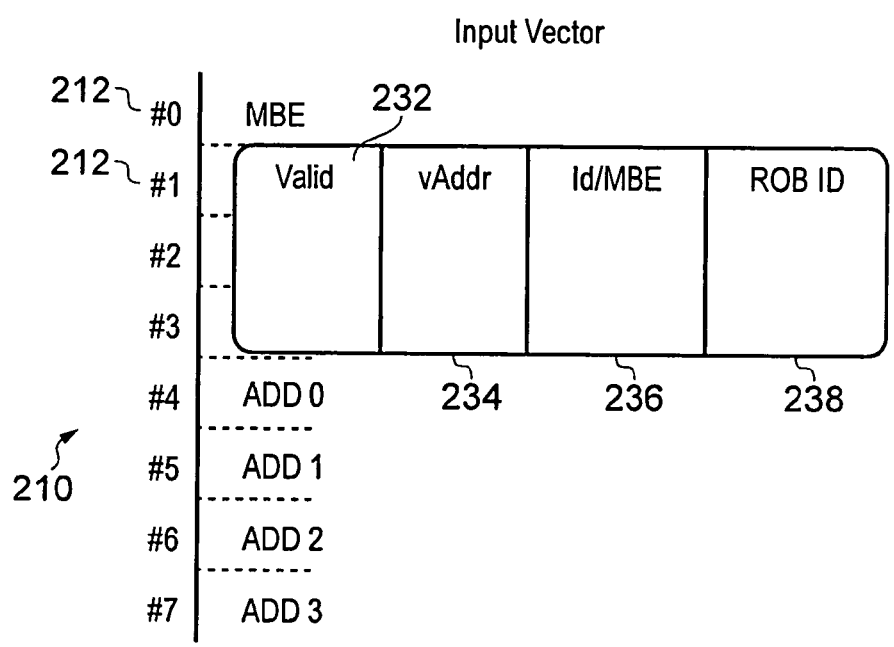
FIG. 13 shows an example of an input vector for buffering pending access request awaiting servicing by the cache.

FIG. 13 shows an example of the input vector. The input vector 210 comprises a number of vector entries 212 for receiving pending access requests. The vector entries 212 have a predetermined priority order, such that the arbiter 230 may select the data access request from entry #0 with a higher probability than the data access request in entry #7, for example. In this example, a merge buffer entry from the merge buffer 16 is placed in vector entry #0, the read access requests received from the address computation stages 10-0 to 10-3 are placed in vector entries #4 to #7, and 3 vector entries #1 to #3 are used to store remaining pending access requests which have not been processed from a preceding clock cycle. Hence, in the example of FIG. 13, the merge buffer entry (MBE) is prioritised ahead of the old read access requests from the preceding cycle, and the old read access requests are prioritised ahead of newer read access requests. In other examples, the priority order may vary, such that for example the old read access requests may have a higher priority than the merge buffer entry.

Each vector entry comprises a valid field 232 which indicates whether the entry represents a valid request. For example, some of the address computation stages 10-0 to 10-3 may not be active in a given cycle, or there may not be a pending merge buffer entry #0 or there may not be enough requests left over from a previous cycle, and so some of the vector entries may be invalid. Each vector entry also has an address field 234 for storing the virtual address associated with the data access request, and a type field 236 which indicates the type of entry (e.g. whether the entry corresponds to a load request or a merge buffer entry). Each vector entry also has an age identifier field 238 (e.g. a reorder buffer identifier or ROB ID field) which stores an age identifier distinguishing different access requests of the same type. The age identifier may be allocated sequentially and may be used, for example, to allow a determination of whether one request is older than another request. It will be appreciated that other information or other age identifiers may also be stored in the vector entries.

Note that the input buffer 210 need not comprise storage locations for all of the vector entries 212. For example, the merge buffer entry and new requests may be read directly from the wires received from the merge buffer 16 and address computation stage 10, so that the input buffer 210 need not actually store any data for these requests. On the other hand, storage can be provided for storing the older requests which were not serviced in a previous cycle. Alternatively, in other examples all the requests may be buffered in storage provided in the input buffer 210.

Turning back to FIG. 12, in each cycle the virtual page ID of the virtual address of the first valid vector entry of the input vector 210 is provided to the TLB 12 to be translated into a physical page ID. Hence, if there is a pending merge buffer entry in vector entry #0, then the virtual page ID of the merge buffer entry is provided to the TLB 12, while if there is no pending merge buffer entry, then the address from entry #1 is provided if that entry contains a valid request, and so on until a valid vector entry is found. The request stored in the first valid vector entry may be referred to as a "primary" request. The TLB 12 translates the virtual page ID of the primary request into a physical page ID, and provides the physical page ID to the arbitration unit 230. Also, the TLB controls the way table 14 to look up a corresponding way table entry in the way discussed above and provide the way table entry to the arbitration unit 230. The arbitration unit 230 provides the physical page ID and the way information, if valid, to the cache 6 for use when servicing the selected requests.

Figure 14:
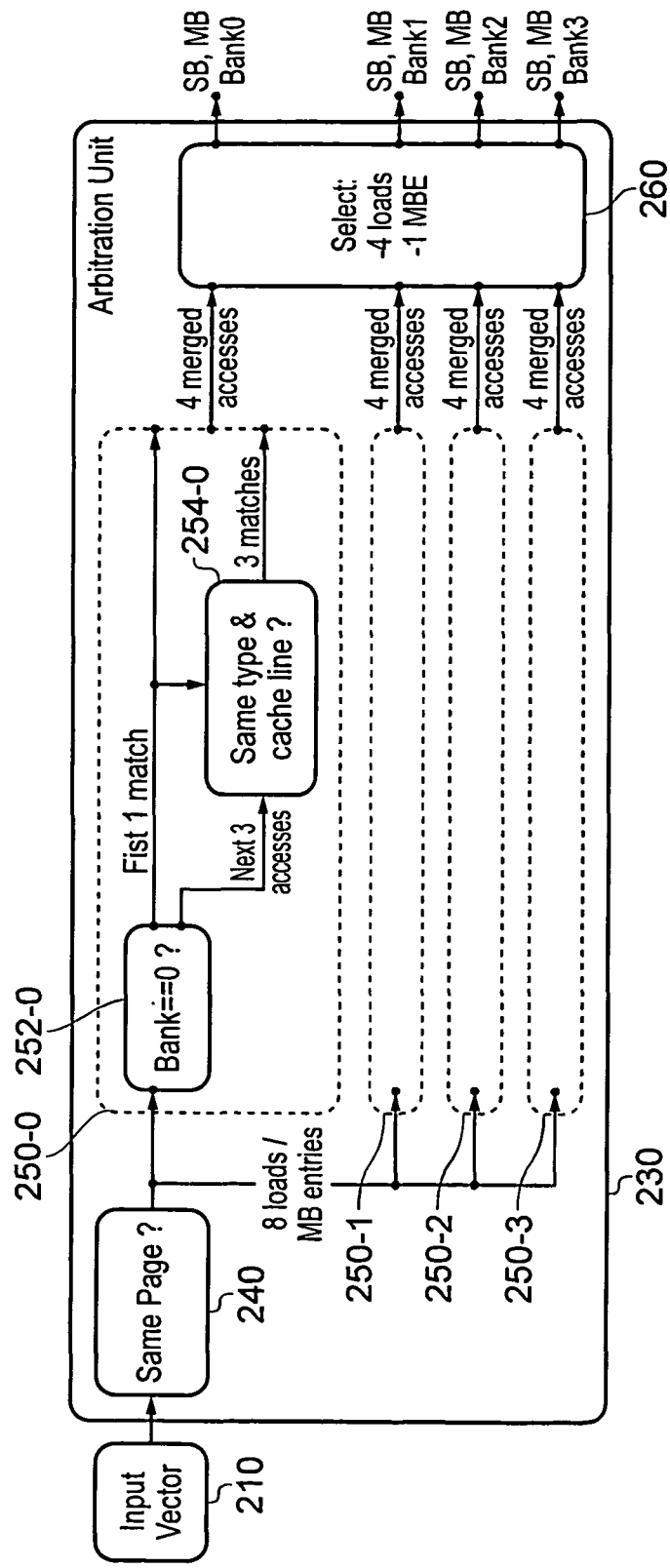
FIG. 14 schematically illustrates an example of an arbitration unit for selecting which pending access request should be serviced by the cache.

FIG. 14 shows an example of part of the arbitration unit 230. The arbitration unit 230 receives the input vector 210 and has a comparator 240 for comparing the virtual page ID of the primary access request (i.e. the virtual page ID sent to the TLB) with the virtual page IDs of the other requests in the input vector 210. Any pending requests for which the virtual page ID matches the virtual page ID of the primary request, including the primary request itself, are selected as candidate requests by the arbiter 230 and are sent to four bank comparators 250-0 to 250-3 corresponding to the four banks 20 of the cache. Requests not having the same virtual page ID as the primary request are not selected as candidates and so must wait until a subsequent cycle to be serviced.

Each bank comparator 250 has a bank identifier 252 and a cache line identifier 254. The bank identifier 252-0 examines the address of each candidate request selected by comparator 240, and determines from a portion of the address (typically, part of the page offset portion 46) whether the address corresponds to bank 0. If there are any candidate access request corresponding to bank 0, then the first of these requests (for example, the request in the highest priority vector entry) is selected and any other requests targeting bank 0 are provided to the cache line identifier 254. If the first candidate request targeting bank 0 is a load request, then the cache line identifier 254 checks whether the other candidate requests targeting bank 0 target the same cache line as the first candidate request targeting bank 0. If so, then these requests are merged with the first candidate request for bank 0, and the merged request is provided to a selector 260. If there are no other candidate requests for bank 0 that target the same cache line as the first candidate request for bank 0, or the first candidate request is a merge buffer entry, then the first candidate request selected for bank 0 is provided to the selector 260 (merge buffer entries cannot be merged with load requests).

Meanwhile, the other bank comparators 250-1 to 250-3 perform the same operation as bank comparator 250-0 in respect of banks 1, 2 and 3. The selector 260 receives the requests (which could be a single request or a merged request) selected by each bank comparator 250-0 to 250-3 and then issues for servicing by the cache a maximum of one request for each bank 20. The selected request are then provided to the cache 6 which services the request, either returning a value in response to a load request or a writing value to the cache in response to the store request indicated in a merge buffer entry. The results of the access requests are then written back to the processor via buses 280 as shown in FIG. 12. When performing the cache accesses, the cache 6 uses the way information provided from the way table 14 in the way discussed above to perform a reduced cache access where possible.

Hence, as shown in FIG. 12 and FIG. 14, the arbiter 230 selects as candidate requests only those requests accessing the same page as the primary access request selected from the input vector 10. The primary request may be, for example, the oldest request, the highest priority request or the highest priority request of a given type. The arbiter 230 then selects among the candidate requests the requests to be serviced in such a way that accesses are spread across the four banks 20 of the cache 6, and requests targeting the same cache line are merged. In this way, among the candidate request the most efficient use of the cache can be achieved.

Note that the selector 260 may limit the total number of requests which can be provided to the cache 6 in the same cycle. The number of results buses 280 that connect the cache 6 to the processor 4 may be limited, and so even if many requests can be merged by the arbiter 230, the selector 260 may have to limit the total number of serviced requests to the number of results buses 280. For example, in FIG. 12 there are 4 result buses and so the selector 260 may select a maximum of four read requests per cycle. One or more merge buffer entries, which do not require result buses 280, may also be selected, depending on the number of requests which can be serviced in the same cycle by the cache 6. The selection of the requests to be serviced may be made in different ways. For example, the selector 260 may prioritise the loads according to their position within the input vector 210.

While it would be possible for the cache line identifier 254 of each bank comparator 250 to compare the first candidate request selected for each bank with all of the other candidate requests targeting the same bank, in the example of FIG. 14 the bank comparator 250 only compares three more candidate requests with the first candidate request for that bank. By limiting the number of comparisons which can be made to identify requests to be merged, the amount of comparator circuitry can be reduced. In practice, it is unlikely that more than four access requests from the input vector would target the same bank and the same cache line within the same cycle, so overall area and energy efficiency can be improved by reducing the number of comparators. On the very rare occasions that more than four access requests target the same bank and the same cache line within the same cycle, some of the requests can be delayed until the following cycle. Moreover, as most accesses to the same cache line tend to be consecutive, the comparison can be implemented efficiently by comparing only a limited number of consecutive requests to identify requests to be merged. Hence, the comparator 250 may compare the next three consecutive requests with the first candidate request, without comparing any further requests.

FIGS. 12 to 14 show an example in which only access requests targeting a single page can be serviced in the same cycle. However, it is also possible to allow more than one page to be handled in the same cycle, for example two page addresses. The TLB 12 and way table 14 would thus need to access two TLB entries and way table entries in the same cycle. An extra TLB port may therefore be provided to receive the second virtual page address and to allow two simultaneous TLB table searches. The arbiter 230 would perform, in parallel, multiple instances of the operations performed by the page comparator 240 and bank comparators 250-0 to 250-3, one instance for each virtual page ID being processed simultaneously. The selector 260 would receive the requests issued from each bank comparator 250-0 to 250-3 for each virtual page ID, and would then select among these requests and issue one request per bank 20 to be serviced the cache 6.

Providing circuitry for handling two different page addresses within the same cycle can be useful because some applications may require memory copy operations in which data is read from one memory location and written to a different memory location. Such operations may often require data access requests to be performed in connection with two different pages of memory, and so it can be more efficient to allow those operations to take place in parallel within the same cycle by enabling simultaneous access requests targeting different pages of memory. Nevertheless, by limiting the maximum number of different pages can be handled in the single cycle to two, the circuitry may still be more efficient than in the case where access request specifying any number of different page addresses can be handled simultaneously. In general, the present technique is applicable in any case where the maximum number of different page addresses which can be handled in the same cycle is less than the total number of access request which can be handled by the cache in parallel.

Figure 15:
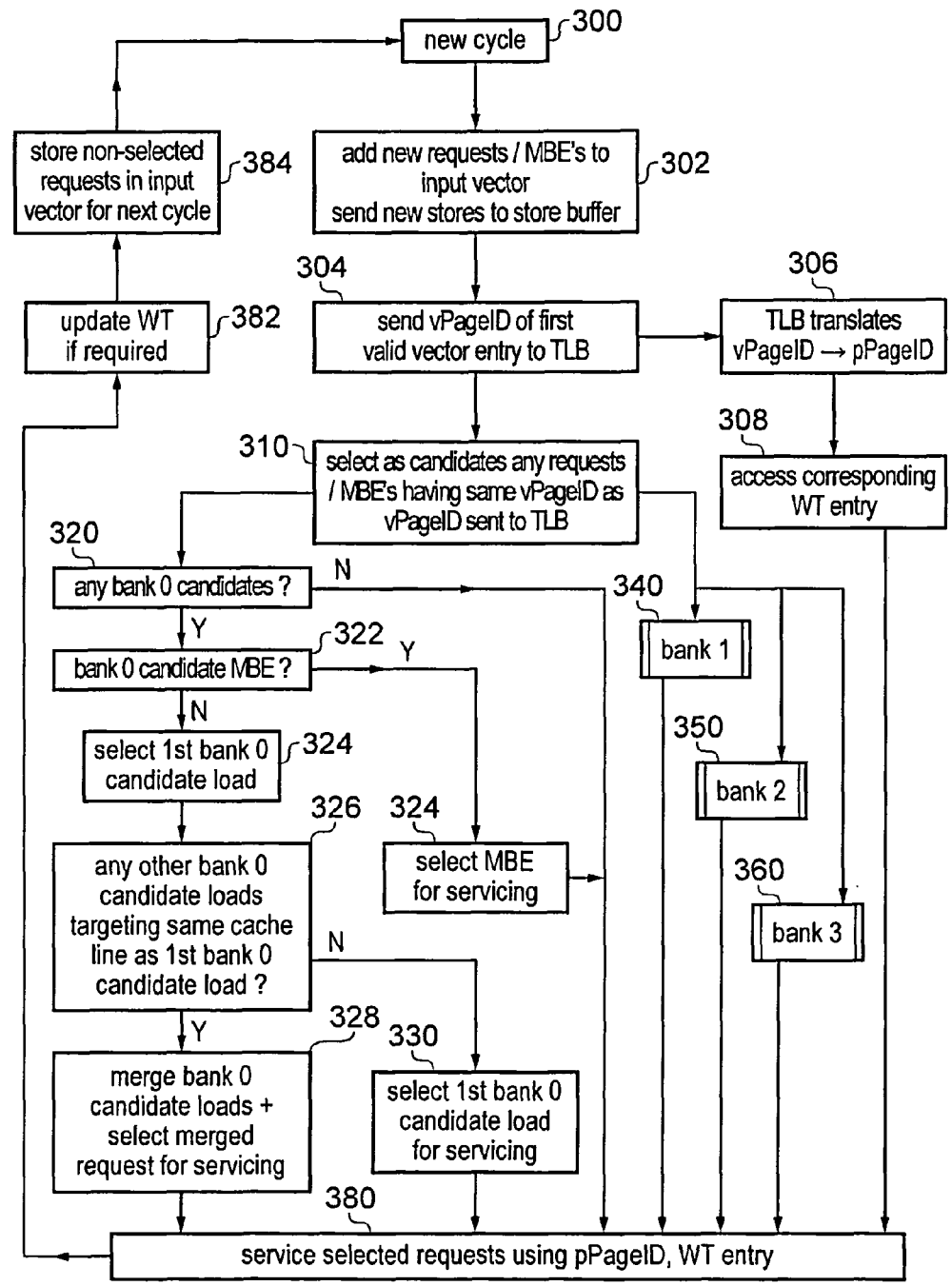
FIG. 15 shows a method of performing cache accesses using the apparatus of FIG. 12.

FIG. 15 illustrates a method of processing data using the apparatus shown in FIG. 12. At step 300, the next processing cycle begins. At step 302, any new requests from the address computation stages 10-0 to 10-3 are input into the input vector 210. Also if there is a merge buffer entry in the merge buffer 16 which is ready to be evicted from the merge buffer 16 then this is also input into the input vector 210. Also, any new stores issued by the processor are written to the store buffer 15 where they may later be merged to form a merge buffer entry 16.

At step 304, the virtual page ID specified by the first valid vector entry (containing the primary access request) is sent to the TLB 12. At step 306, the TLB 12 receives the virtual page ID of the first valid vector entry and locates the corresponding TLB entry. The TLB translates the virtual page ID to a physical page ID using the TLB entry and returns the physical page ID to the arbitration unit 230. Also at step 308, the way table 14 accesses the corresponding way table entry and the way table 14 sends the way information contained in the way table entry to the arbitration unit 230. When requests are sent to the cache 6 for servicing, the arbitration unit 230 provides the corresponding physical page ID and way information to the cache 6 for use when servicing the requests. Since all requests serviced in the same cycle share the same page ID, the same physical page ID and way table entry can be used for all the requests.

Meanwhile, at step 310, the arbitration unit 230 selects as candidate access requests any of the load requests or merge buffer entries in the input vector 210 which have the same virtual page ID as the virtual page ID sent to the TLB 12. Any requests having different page IDs are not selected.

At step 320, the bank comparator 250-0 checks whether any of the candidate access requests selected at step 310 require access to bank 0 (these requests are referred to as "bank 0 candidate access requests"). If there is at least one bank 0 candidate access request, then at step 322 the bank comparator 250-0 checks whether one of these requests is a merge buffer entry. If so, then at step 324 that merge buffer entry selected to be serviced by the cache. If there is no bank 0 candidate merge buffer entry, then at step 324 the bank comparator 250-0 selects the first valid candidate load request that targets bank 0. At step 326, the cache line identifier 250-0 examines the other candidate loads targeting bank 0 and checks whether there are any other bank 0 candidate loads which target the same cache line as the first bank 0 candidate loads selected at step 324. If there are such other loads, then at step 328 the loads targeting the same cache line are merged; and the selector 260 selects the merged request for servicing by the cache. If there are no other bank 0 candidate load requests targeting the same cache line as the first bank 0 candidate load, then at step 330 the first bank 0 candidate load is selected for servicing by the cache.

Meanwhile, at steps 340, 350, and 360, the other bank comparators 250-1, 250-2 and 250-3 perform the same steps as in steps 322 to 330 with respect to the candidate requests selected at step 310 that target banks 1, 2 and 3 respectively. Hence, for each bank, if there is at least one candidate request targeting that bank, then a request will be selected for that bank. All the selected requests are sent to the cache 6, and are serviced by the cache 6 at step 380 using the physical page ID and way table entry obtained at steps 306, 308. At step 382, the cache 6 signals to the way table 14 if an update of the way table information is required (if one of the cache accesses results in a cache line fill, eviction, or micro way table miss/cache hit, as discussed previously), and the way table 14 updates the corresponding fields of the way table entry accordingly. At step 384, any access requests remaining in the input vector 210 which have not been serviced by the cache 6 in this cycle are stored in vector entries #1, #2 or #3 as shown in FIG. 13 for selection in the following cycle. Hence, these requests will be prioritised ahead of new requests. At step 300, the next cycle begins and the method of FIG. 15 begins once more.

The store buffer 15 and merge buffer 16 can be further optimised in the context of an embodiment which allows only one virtual page address to be handled within the same cycle. To allow fully associative searches by up to four loads per cycle, the corresponding comparator arrays for searching the store buffer 15 and merge buffer 16 would usually need to be replicated four times. However, if all requests serviced within one cycle have to access the same page, then the comparator arrays responsible for address comparisons can be separated into one common comparator for a virtual page address and four independent comparators for the remaining address fields. For a system using 32 bit addresses and 4 Kbyte pages, this saves three 20 bit comparisons, thus saving energy.

In summary, the present technique is able to service multiple cache accesses in parallel to one another with only a limited number of TLB ports for performing TLB translations and a limited number of comparators in other portions of the system such as in the arbiter 230 or cache 6. This enables a more efficient system with lower energy consumption.

Further information about the present technique is provided below.

1. Introduction

Modern out-of-order superscalar processors rely on speculative execution, wide issue windows and multiple data paths to exploit instruction-level parallelism (ILP), and on memory hierarchies comprising fast on-chip SRAM caches to improve memory access latency and throughput. As a high percentage of all instructions are memory references (40% on average for SPEC CPU2000 running on ARMv7), it is vital for first-level data caches to support multiple accesses in parallel (see Section 2). This problem is exacerbated by advanced memory speculation and disambiguation techniques, which are fairly common in the latest generation of microprocessors, and by vector extensions, like Intel AVX and ARM NEON, which provide support for the SIMD computation paradigm and can introduce even more demanding requirements for the memory subsystem.

However, finite energy sources and limitations in semiconductor technology scaling result in fixed energy budgets for mobile devices; in addition, cooling and electricity costs are becoming increasingly important in the desktop and server segments. As a consequence, energy efficiency has become a determining factor for microprocessor designs and one of the main obstacles to performance improvements. As caches are one of the main contributors to the on-chip power consumption, cache-level optimisations need to trade-off increased performance with degraded energy efficiency.

This technique addresses the problem of implementing multiple-access L1 data caches in an energy efficient manner. Current high end microarchitectures like Intel's Sandy Bridge and AMD's Bulldozer allow up to two 128-bit loads and one 128-bit store per cycle. Both rely on physical multi-porting and cache banking. The former technique is based on modified SRAM cells with multiple ports; it allows low access latencies, but introduces large energy and area penalties. Contrarily, banking effectively reduces the energy consumption per access, by utilizing several smaller structures, each holding a sub-set of cache lines. While banks can be accessed independently to service multiple memory references, accesses mapping to the same bank need to be serialized (bank conflicts). Upcoming processor generations require even more sophisticated cache interfaces to handle aggressive memory speculation and disambiguation techniques as well as advanced vector extensions (e.g. Intel's AVX2 supporting non-unit strided loads).

The problem of handling multiple concurrent memory accesses has already been analysed in the context of vector machines. Tarantula, CODE and the VT architecture are examples of specialized vector architectures. However, these designs require a significant amount of dedicated hardware, and the implemented solutions, while effective on workloads with abundant data-level parallelism, are not suited for general-purpose microprocessors. Key features of modern caches are high capacity and set-associativity to accommodate large working-sets and reduce miss rates, respectively. Yet, although a particular datum can only be located in one way, the lookup of an n-way set-associative cache requires n tag comparisons and n data-array accesses. Techniques that attempt to save energy by avoiding redundant accesses may be categorized as "way prediction", "way estimation" and "way determination" schemes. The first group predicts ways based on MRU statistics. While this concept is simple to implement, false predictions require a second cache access to find the desired datum within the previously discarded ways. Other schemes attempt to mitigate this problem by increasing prediction accuracy based on a combination of selective direct-mapping and way-prediction. Way estimation techniques deliver a set of ways instead of a single way. If the desired data resides within the cache, it is guaranteed to be found there. Consequently, cache accesses require no more than one cycle, but may consume energy for several redundant tag comparisons. An alternative group of techniques determines rather than predicts ways. A way determination unit (WDU) stores way information for a set of recently used cache lines in a small buffer. Each line is associated with exactly one way and guaranteed to hit there or miss the whole cache. The WDU requires a fully associative lookup structure including one port per parallel access, resulting in energy efficiency inversely proportional to its size. Consequently, it is limited to systems with high temporal locality of cache accesses designed to service a low number of loads and stores in parallel.

The Multiple Access Low Energy Cache (MALEC) proposed in this technique is based on the observation that consecutive memory references are very likely to access the same page. Consequently, it shares memory address translation results between multiple accesses and simplifies the lookup structures of certain components common in superscalar out-of-order processors (i.e. store and merge buffers). Page-based access grouping furthermore allows the application of a small set of comparators to identify loads accessing the same cache line. Sharing data received from a single cache access among those loads effectively reduces the number of bank conflicts. Moreover, MALEC introduces a novel way determination scheme that simultaneously provides way information to loads and stores accessing the same page. It is capable of re-using address comparisons required for TLB lookups to simplify its own lookup mechanism. With the addition of validity information for way determinations it enables a majority of memory references to completely avoid tag comparisons and directly access desired cache lines. This distinguishes MALEC from other prediction schemes for D-caches that need to verify their results with at least one tag comparison.

2. Motivation

A primary performance metric for superscalar processors is the number of instructions executed per cycle. Our analysis of the SPEC CPU2000 and MediaBench2 benchmark suites showed a severe impact of memory references on this metric. In fact, they constitute 40% of all instructions (ratio loads:stores=2:1). SIMD extensions, which operates on vectors rather than scalars, further intensifies the need for a powerful cache interface.

Figure 16:
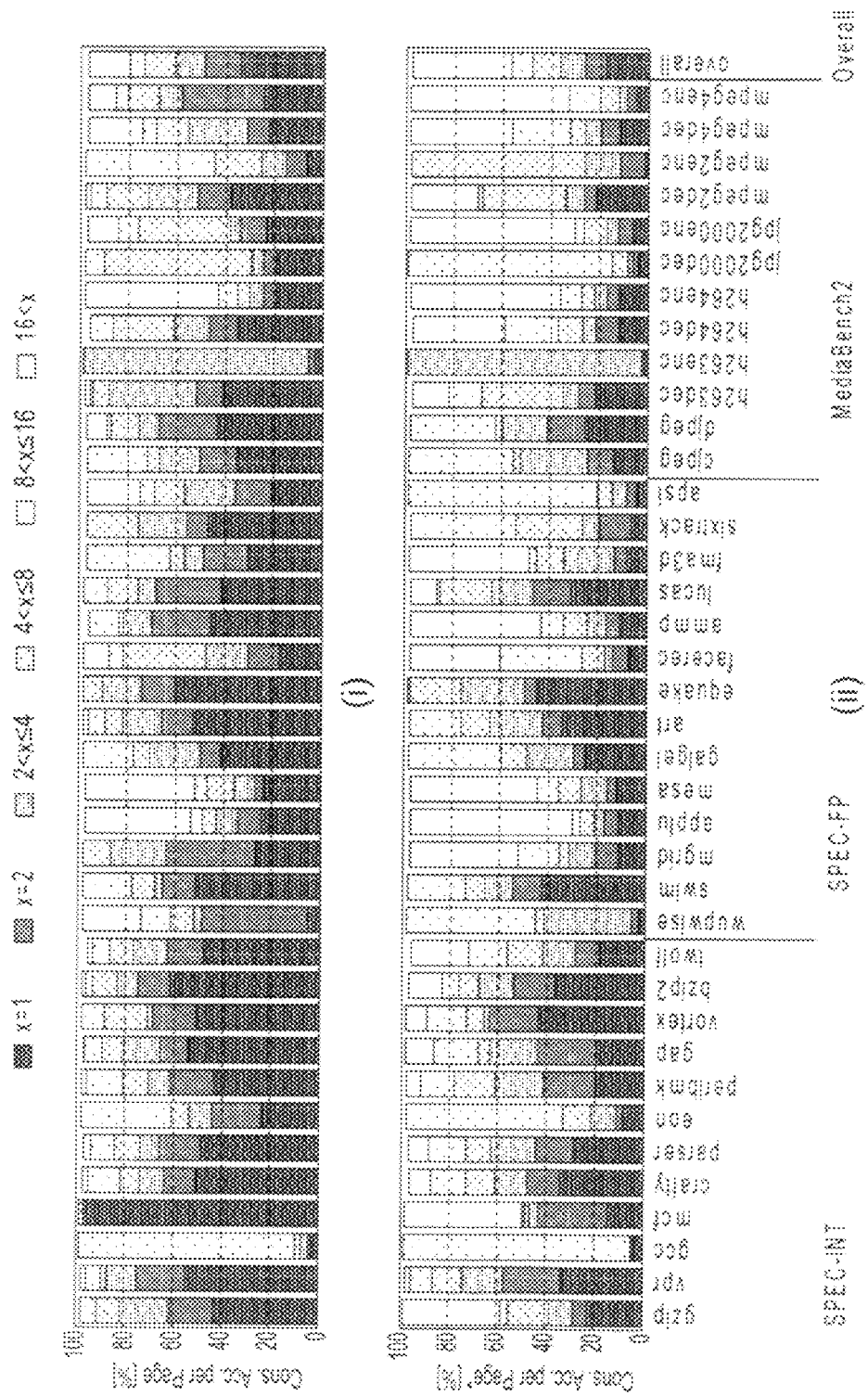
FIG. 16 shows simulation results indicating (i) typical numbers of consecutive accesses that target the same memory page, (ii) typical numbers of accesses which target the same page allowing for one intermediate access to a different page, and (iii) numbers of accesses that target the same cache line.
Figure 16:
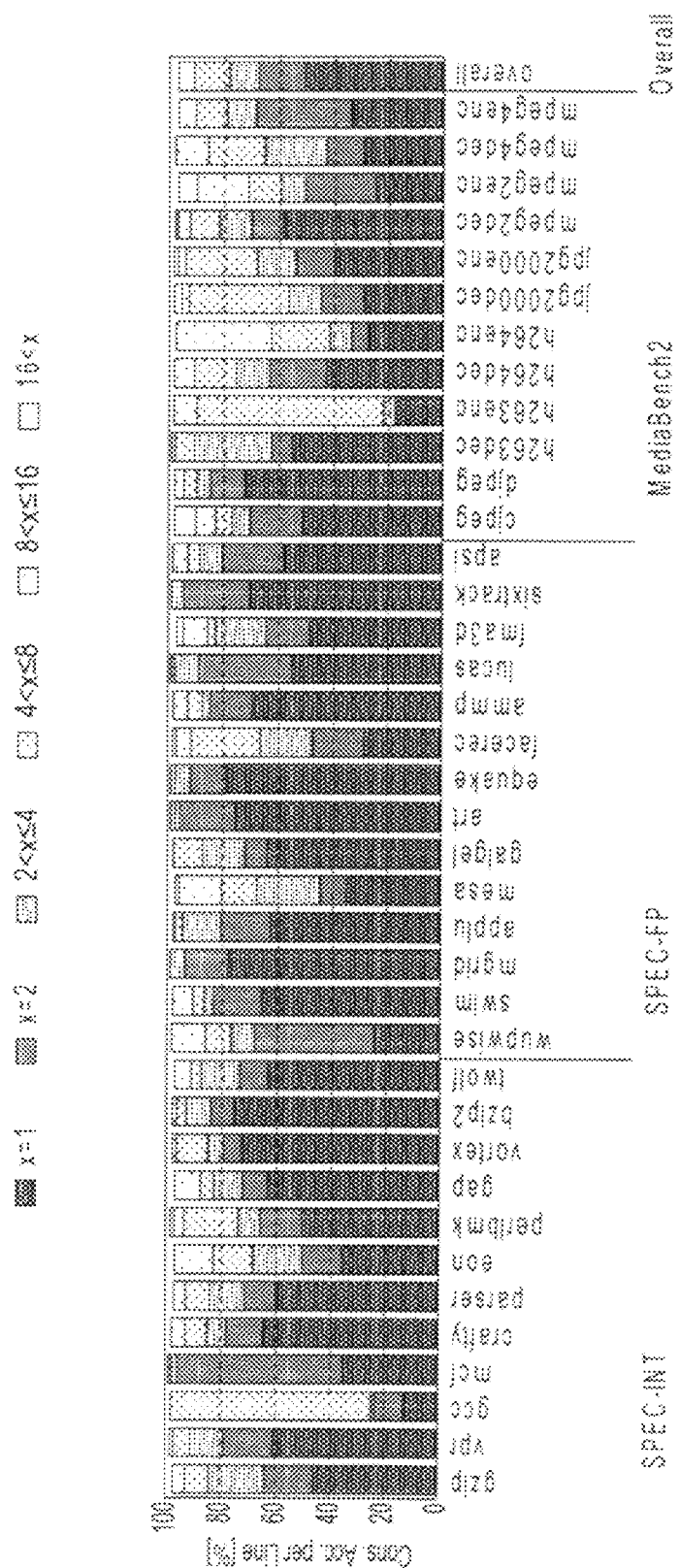

FIG. 16(i) illustrates the relation between consecutive read accesses to an L1 D-cache. The results were obtained using binary instrumentation tools to analyze the most representative execution phase of each benchmark identified by Simpoint v3.0 for intervals of 1 billion instructions. In particular, FIG. 16(i) shows that overall 67% of consecutive reads are followed by at least one read to the same page; i.e. 15%, 14%, 12%, 6% and 20% of reads are followed by 1, 2 to 3, 4 to 7, 8 to 15 and more than 15 reads to the same page, respectively. FIG. 16(ii) extends this analysis by allowing one intermediate access to a different page, resulting in 83% of reads being followed by at least one access to the same page. Allowing two and three intermediate accesses further increases this number to 90% and 95%, respectively (not shown in FIG. 16). Consequently, the majority of loads are suitable for the page-based memory access grouping introduced in Section 4. Similar analyses concerning stores reveal an even higher grade of address locality. However, as store and merge buffers—described in Section 3—significantly alter the corresponding cache access patterns, they are not further discussed here.

FIG. 16(iii) investigates opportunities for line- rather than page-based memory access grouping. It shows that 46% of loads are followed by at least one other load accessing the same cache line. MALEC exploits this observation by allowing up to four loads to share results read from one particular cache line. Section 6 analyzes the performance impact of page-based memory access grouping and D-cache line sharing for specific MALEC configurations.

3. Basic Processor Cache Interface

Figure 17:
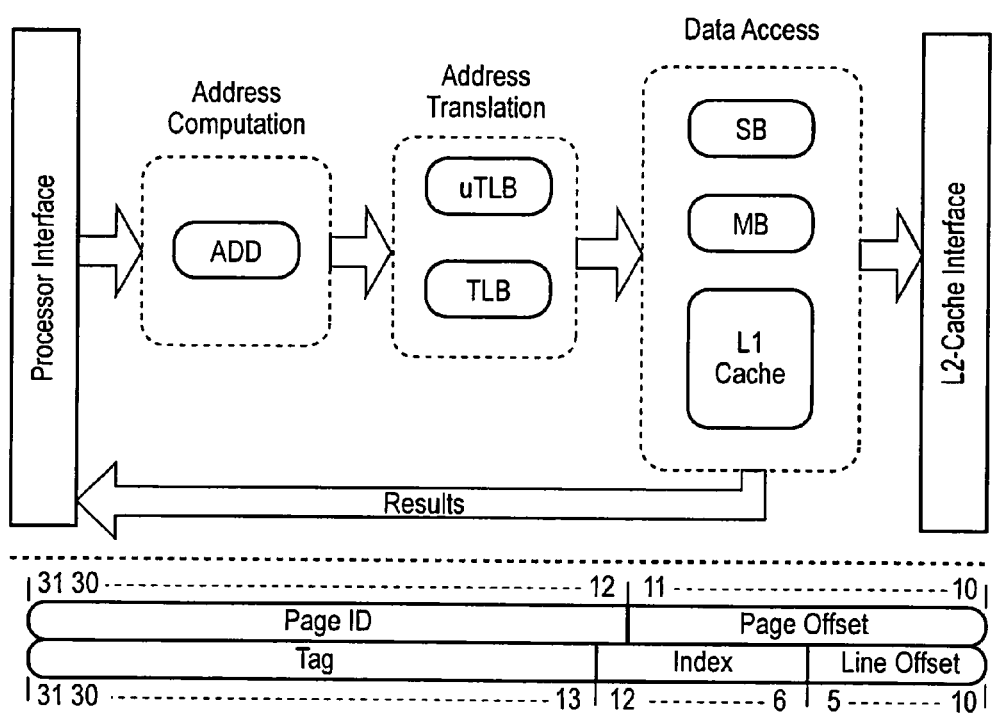
FIG. 17 shows a typical high performance out-of-order processor-cache interface, and naming conventions for memory address bit fields.

Since MALEC targets out-of-order superscalar processors, it is important to consider a variety of complex components relevant for those designs. FIG. 17 depicts a sophisticated L1 cache interface in simplified form. Each load and store issued by the processor undergoes address computation, address translation, data access and if necessary lower level cache accesses. Address computation circuitry generates application specific virtual addresses, which need to be translated into physical addresses prior to memory hierarchy accesses. Note that MALEC assumes a physically indexed, physically tagged L1 data cache, as it is a common design choice in today's microprocessors. Address translations are performed based on page-granularity (e.g. 4 Kbyte of memory address space). They involve a hierarchy of page tables and Translation Lookaside Buffers (TLBs). TLBs are closest to the processor and hold information on a small set of recently accessed pages to reduce translation latency and energy consumption. Micro TLBs (uTLBs) further exploit data locality by including only a sub-set of TLB entries. Also part of FIG. 17 are naming conventions for memory address bit fields used in this example. The bit field sizes correspond to the design parameters described in Section 6; i.e. a 32 bit system bus, 4 Kbyte pages and a 4-way set-associative cache holding 32 Kbyte of data in 64 Byte wide lines. While most of these parameters are feasible for high performance processors, the choice of a 32 bit system bus is dictated by the utilized simulation framework. However, architectures with larger physical address spaces (40-48 address bits) would benefit even more from energy optimizations introduced by MALEC (see Section 4).

The Store Buffer (SB) shown in FIG. 17 is used in out-of-order machines to allow the speculative execution of stores. It holds information on in flight stores and allows forwarding of data to dependent loads. Not part of FIG. 17, but relevant later on, is the SB's equivalent for loads. A load queue holds in flight loads and is used to detect data dependency violations. When stores are committed, the corresponding SB entry is evicted and send to the Merge Buffer (MB). The MB is a small memory structure that attempts to reduce the number of L1 cache accesses by merging data from multiple stores to the same address region. Only if a newly committed store can't be merged or allocated to a free entry, the oldest MB entry is evicted and written to the L1 cache. Loads usually access SB, MB and L1 cache in parallel to avoid additional latencies. Multiplexers combine the results received from all three sources prioritizing the SB over the MB and the MB over the L1 cache.

FIG. 2 illustrates an example for a 4-way set-associative cache. The design uses two independent cache banks, each holding data corresponding to a specific address region; e.g. bank 0 even, bank 1 odd lines. As banks are smaller than the whole cache, they can be accessed faster and more energy efficient. A bank is identified by the least significant bit within the index field of a memory address (see FIG. 17). The remainder of the index field is used to select a cache line within a particular bank. Each line is composed of a tag-array entry to clearly identify its memory location and an data-array entry. The banks in FIG. 2 are furthermore 4-ways set-associative, which allows each line to be cached in four different locations. This significantly improves hit rates, but the lookup of four possible locations increases the energy required per access. A conventional cache needs to access all four tag- and data-array pairs in parallel to match tags and select the corresponding data.

4. Page-Based Access Grouping

FIG. 12 illustrates an example of the proposed multiple access low energy cache interface designed to service up to four memory requests in parallel. Note that WT and uWT will be explained as part of the way determination scheme in Section 5. They are not compulsory for the operation of MALEC. The apparatus supports up to four parallel memory accesses. An intuitive approach to achieve this capability would simply increase the number of ports of corresponding queues and replicate circuitry for address computation and priority multiplexing.

Stores finishing address computation are directly sent to the SB to reduce the number of address translations per cycle. This does not impose a significant performance penalty, as stores commit to the MB instead of the L1. Contrarily, loads finishing address computation represent four out of eight entries of the so called Input Vector. The remaining entries are up to three loads that could not be serviced in previous cycles and up to one Merge Buffer entry (MBE). Entries are prioritized in the order: old loads, new loads and evicted MBE. Reason for the low priority of evicted MBEs is the fact that stores represented by an MBE are already committed and therefore no longer time critical. At the start of each cycle, the virtual page ID (vPageID, see FIG. 17) of the highest priority Input Vector entry is passed to the uTLB for a conventional address translation. Simultaneously, this vPageID is compared against all remaining, currently valid entries. All matching entries are then passed to the Arbitration Unit, where for each bank the access with the highest priority is identified and—in case of a load—grouped with up to three consecutive loads following it. Splitting the comparison of vPageID and remaining address bits reduces the complexity of the Arbitration Unit's comparators. The approach to further reduce this complexity by comparing only three consecutive loads instead of all Input Vector entries covers the majority of groupable loads, as indicated by Section 2. Next, the Arbitration Unit limits the number of loads to the number of available result buses, by selecting the four highest priority loads. An alternative system might determine the combination of loads that requires the least number of cache accesses. However, the increased complexity of such circuitry would require more energy and time per cycle.

Memory accesses selected by the Arbitration unit are sent to the L1 cache and in case of loads also to the SB and MB. The cache itself is unmodified to allow the implementation of highly optimized designs. A special case are sub-banked caches that attempt to save energy by splitting data arrays in smaller independent banks (usually 128 bit wide). MALEC requires those designs to return data from two sub-banks for every read access, instead of only for those that exceed one sub-bank. This effectively doubles the probability for loads to be able to share results read from cache. The designs of SB and MB are slightly modified to reduce the energy impact of additional ports required to service up to four loads in parallel. Specifically, their lookup structure is split into two segments. One to look up address bits corresponding to the vPageID shared among all four loads. The second to compare the remaining bits that identify access specific address regions (i.e. cache lines/sub-banks). As both segments are looked up simultaneously, the MB and SB energy requirements are reduced without introducing additional latencies. Note, as SB and MB are in contrast to the L1 cache virtually tagged, the vPage lookup could actually be performed prior to address translation. However, this would complicate the execution of address translation and data access in separate pipeline stages as it is common for high performance processors.

In summary, MALEC attempts to service multiple instructions in parallel by utilizing techniques like cache banking and merge buffers. In addition, it allows loads to share data read from L1 cache lines and introduces mechanisms to improve energy efficiency. Page-based memory access grouping is utilized to re-use page translation results and simplify address comparisons within the Arbitration Unit, the SB and the MB. The Arbitration Unit is further simplified by the limitation to three consecutive accesses following the highest priority load to a particular bank.

A key concern of MALEC is the latency introduced by its components. To address this, the Input Vector masks the latency of vPageID comparisons by performing them simultaneously to uTLB/TLB accesses. Comparisons between the remaining address bits to identify loads accessing the same cache line are done in parallel within the Arbitration Unit. Consequently, the units overall latency is equivalent to one narrow comparator and some additional control circuitry. Another concern is the scalability of MALEC. In fact, its efficiency is proportional to the number of parallel memory requests generated by the processor. Reason for this is the increasing probability to have multiple accesses within the Input Vector that may share address translations, way information and—in case of loads to the same cache line—data read from L1. Furthermore, MALEC would benefit systems with 40 bit or 48 bit of address space even more, because the additional energy needed for vPage comparisons within the Input Vector is outweighed by higher savings due to the reduced number of address translations and the simplified SB and MB lookups. In addition, larger L1 tag-arrays further improve the efficiency of MALEC's way determination scheme (see Section 5). Finally, a major concern for out-of-order processors is the handling of precise exceptions. The amount of speculative state held by MALEC itself is limited to loads within the Input Vector and the Arbitration Unit. All other information, e.g. in form of uWT/WT entries or evicted MB entries, is non-speculative and therefore of no concern for any recovery mechanism.

5. Page-Based Way Determination

Key components of the way determination scheme proposed in this technique are the so called Way Table (WT) and Micro Way Table (uWT) (see FIG. 12). They are heavily interwoven with the TLB and uTLB. In fact, TLB and WT behave similarly to a cache's tag- and data-array. TLB hits return a corresponding WT entry in addition to the address translation result. Consequently, the energy for page-sized address lookups is split over both components. Each WT entry contains way and validity information for all cache lines within one page. For a system with 4 Kbyte pages and 64 Byte cache lines, each WT entry holds information on 4096/64=64 lines. The position of data within a WT entry implicitly encodes the line address associated with it; i.e. the first and last bit field identify lines 0 and 63, respectively. The number of bits stored per line is proportional to the L1 cache associativity; e.g. 2 bit for 4 ways. Note that a cache consisting of four banks may hold lines 0 . . . 3 in separate banks and lines 0, 4, 8, . . . 60 in the same bank (see Section 3). By deeming way 0 invalid for lines 0 . . . 3, way 1 invalid for lines 4 . . . 7 and so on, MALEC incorporates validity information within the 2 bit associated with each line. Hence, the size per WT entry results to 64*2 bit=128 bit. This does not significantly impact the performance of L1 replacement policies. In particular, simulations based on the described cache interface, an LRU replacement policy and the benchmark suites introduced in Section 6, did not show any measureable decrease in the L1 hit rate.

The Arbitration Unit evaluates WT entries by associating ways to groups of desired cache lines and forwarding them to the corresponding cache banks. MALEC utilizes way information by supporting two different access modes for the previously introduced cache design of FIG. 17:
Conventional cache access (way unknown):
  parallel access to all tag- and all data-arrays
  select data associated with matching tag
Reduced cache access (way known and valid):
  No tag arrays accessed
  access to one specific data-array only
Prerequisite for reduced cache accesses is the accuracy of way information. Updates of uWT and WT are performed on each cache line fill and eviction, whereby the WT is only accessed if no uWT entry was found. The synchronization of uWT and WT is based on full entries transferred during uTLB updates. As update information generated by the cache is physically addressed, uTLB and TLB need to be modified to allow lookups based on physical in addition to virtual PageIDs. Furthermore, the finite number of TLB entries might require the eviction of a page that still has corresponding lines within the cache. Should one of these lines be re-accessed later on, a new WT entry is allocated and all way information invalidated. To compensate for the loss of information, the last read uWT entry is held alive and way information updated on subsequent cache hits if necessary.

Important parameters for way determination schemes are energy consumption, latency and scalability. As uWT/WT accesses and address comparisons within the Arbitration Unit are handled in parallel, latencies introduced by both components may be overlapped. The scheme is designed to simultaneously deliver way predictions for all lines within one page, and is therefore independent of MALEC's actual computation performance. The scheme becomes more energy efficient for wider L1 cache lines and address busses (e.g. 48 bit), because WT entries are reduced in size and savings due to re-used TLB address lookups increased, respectively. Although higher cache associativities would require wider WT entries, the additional energy saved due to way determination actually increases the scheme's efficiency. Finally, as large pages (e.g. 64K) would significantly increase the number of lines hold per WT entry, the scheme requires TLB entries to be quantized in 4 Kbyte segments when entering the uTLB. The WT itself can be segmented into a small number of chunks, each representing data corresponding to a 4 Kbyte address space. By allocating and replacing chunks in a FIFO or LRU manner, their number can be smaller than required to represent full pages.

6. Evaluation and Results

In order to evaluate the impact of MALEC on performance and energy consumption and to compare it to existing schemes, the gem5 Simulator System was extended to support an enhanced processor-cache interface capable of modelling the micro-architectural aspects involved in this study with cycle-level accuracy. Access statistics obtained from gem5 are then combined with energy estimates calculated using CACTI v.6.5 to determine the energy consumption of the data cache subsystem, including both static and dynamic components. In particular, the evaluation includes the energy contribution of the following structures: L1 data cache (including tag&data SRAM arrays and control logic), uTLB+uWT and TLB+WT. While the modelled L1 cache interface includes other structures, like LQ, SB, and MB, their contribution to the overall energy consumption is not taken into account for two reasons: first, L1, uWT and WT account for the majority of transistors of the L1 interface, and therefore its leakage power. Second, the energy contributed by other components like LQ, SB and MB is very similar between MALEC and the analysed baselines. Our simulations show that this is also the case for lower memory levels, i.e. L2 cache and main memory, as MALEC alters the timing of L2 accesses, but does not significantly impact their number or miss rate.

TABLE 1

| | Address computations per cycle | uTLB/TLB ports | Cache Ports per Bank |
|---|---|---|---|
| Base1ldst | 1 ld/st | 1 rd/wt | 1 rd/wt |
| Base2ld1st | 2 ld + 1 st | 1 rd/wt + 2 rd | 1 rd/wt + 1 rd |
| MALEC | 1 ld + 2 ld/st | 1 rd/wt | 1 rd/wt |

Table 1 characterizes the analyzed baseline and the chosen MALEC configuration in terms of potential address computations per cycle (ld. load, st. store, ld.st. load or store), as well as number of uTLB, TLB and cache ports (rd. read, wt. write, rd/wt. read or write). While Base1ldst is restricted to a single load or store per cycle, Base2ld1st represents a high performance configuration allowing up to two loads and one store in parallel. As the simulated processor is optimized for Base2ld1st, the MALEC configuration introduced in Section 4 is scaled down to achieve a similar performance. This allows fair comparisons particularly between Base2ld1st and MALEC.

TABLE 2

| Component | Parameter |
|---|---|
| Processor | Single-core, out-of-order, 1 GHz clock, 168 ROB entries, 6 element fetch&dispatch width, 8 element issue width |
| L1 interface | 64 TLB entries, 16 uTLB entries, 40 LQ entries, 24 SB entries, 4 MB entries |
| L1 D-cache | 32 Kbyte capacity, 64 byte line size, 2 cycle latency, 4 independent banks, 4-way set-associative, physically indexed, physically tagged |
| L2 cache | 1 MByte capacity, 16-way set associative |
| CACTI | 32 nm technology, design objective low dynamic power, cell type low standby power for data & tag arrays and high performance for peripherals, L1 with ECC |

The configuration of the simulated system is based on an ARMv7-compatible single-core out-of-order processor operating at 1 GHz. Relevant configuration parameters of the analyzed processor-cache interface are summarised in Table 2. The benchmark suites utilized in this study, MediaBench 2 (MB2), SPEC CPU2000 Int and FP, represent a set of workloads with a multitude of different memory access behaviours. In case of MB2 we enabled automatic vectorization using the NEON SIMD engine, to increase their pressure on the L1 interface by these benchmarks. In order to reduce simulation times, SimPoint v.3.1 was used to identify the most representative execution phase of each benchmark. Each phase includes 1 billion instructions of the corresponding reference working set.

6.1 Performance Evaluation

Figure 18:
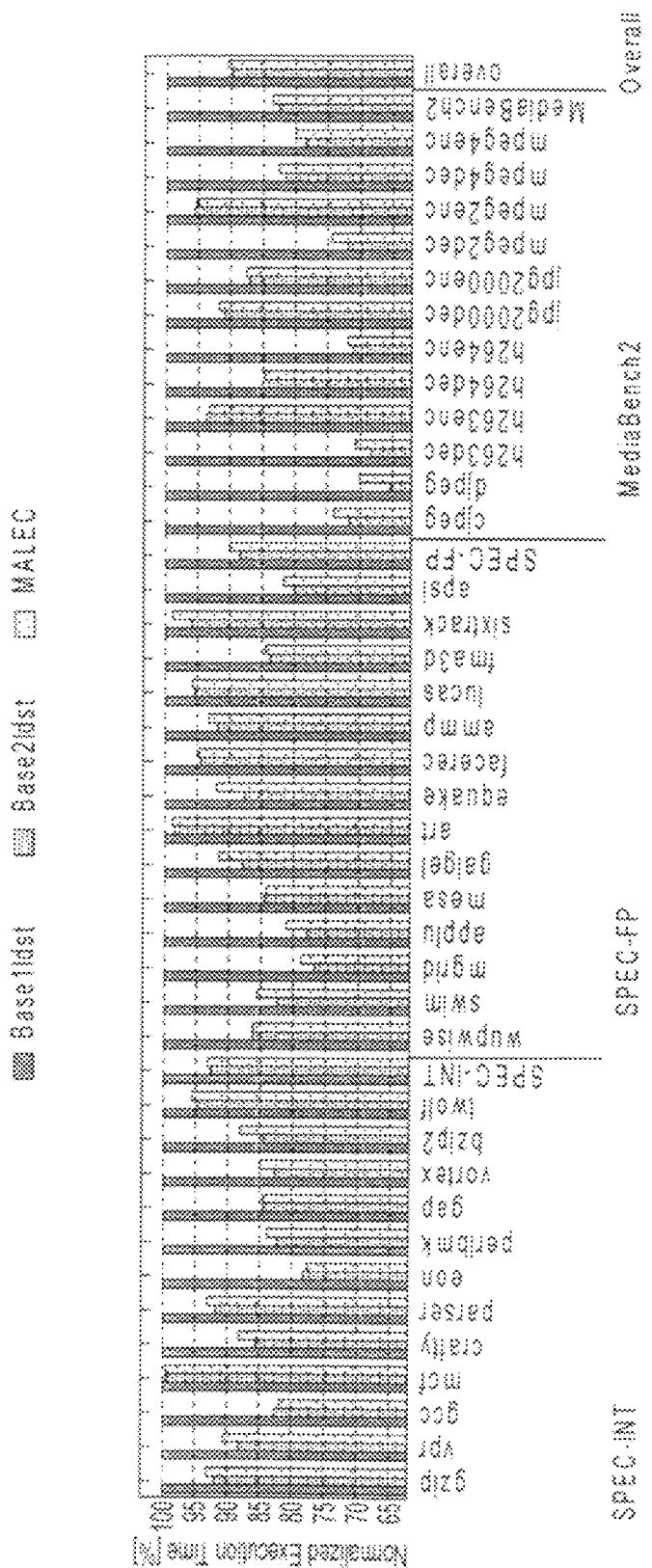
FIG. 18 illustrates results of a simulation of the performance achieved using the present technique.

FIG. 18 illustrates the performance of Base2ld1st and MALEC relative to Base1ldst in terms of CPU cycles required per benchmark. The graph also includes arithmetic means for each suite and the whole of the analyzed benchmarks. It can be observed that although MALEC utilizes single ported uTLB, TLB and L1 similar to Base1ldst, it achieves an average performance improvement of 9%. This is only 1% less than Base2ld1st, which requires these components to be multi-ported. Comparing SPEC-Int, SPEC-FP and MB2 averages yields performance improvements of 7%, 10% and 16%. Reason for the increased benefits for SPEC-FP over SPEC-Int is a reduced number of control instructions compared to memory references; i.e. SPEC-FP benchmarks are more data instead of control intensive. MB2 benefits even more, because its media kernels rely on frequent, highly structured memory accesses to compute basic operations on extensive data sets. Particularly mcf and art show almost no improvement over Base1ldst. Reasons for this are large working sets combined with low locality leading to high miss rates that do not benefit from faster L1 accesses. Contrarily, djpeg and h263dec exhibit high access localities and tend to execute memory accesses in parallel, resulting in speedups of approximately 30% for MALEC.

Figure 20:
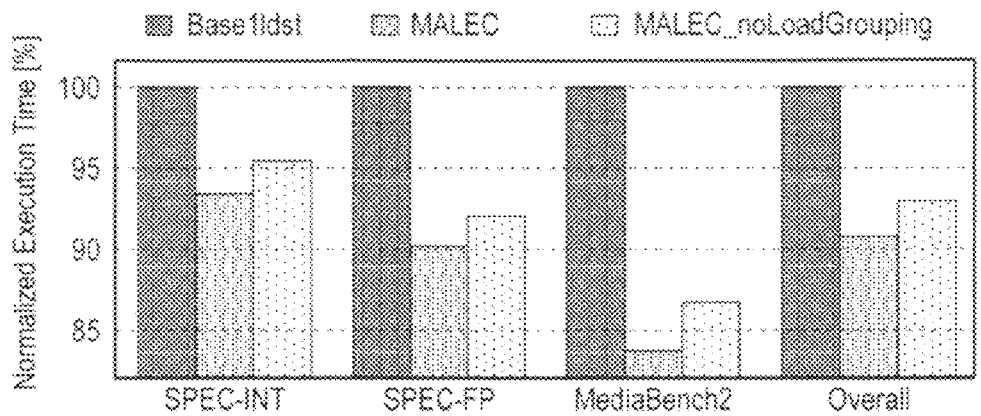
FIG. 20 illustrates the effect of sharing L1 data among loads.

Performance benefits granted by MALEC over Base1ldst originate from two mechanisms: grouping of loads to the same cache line and accessing multiple cache banks in parallel. FIG. 20 illustrates results of MALEC and a configuration without the ability to group loads (MALEC NoLd-Grouping). On average, the grouping of loads contributes approximately 20% to MALEC's overall performance improvement. However, for particular benchmarks this value is significantly higher, e.g 56% for gap and 45% for mpeg4enc. Finally, an overall performance difference of just 1% between MALEC and Base2ld1st in FIG. 18 confirms the results obtained in Section 2, which implied that it is sufficient to handle only those instructions in one cycle that access the same page.

6.2 Energy Evaluation

Figure 19:
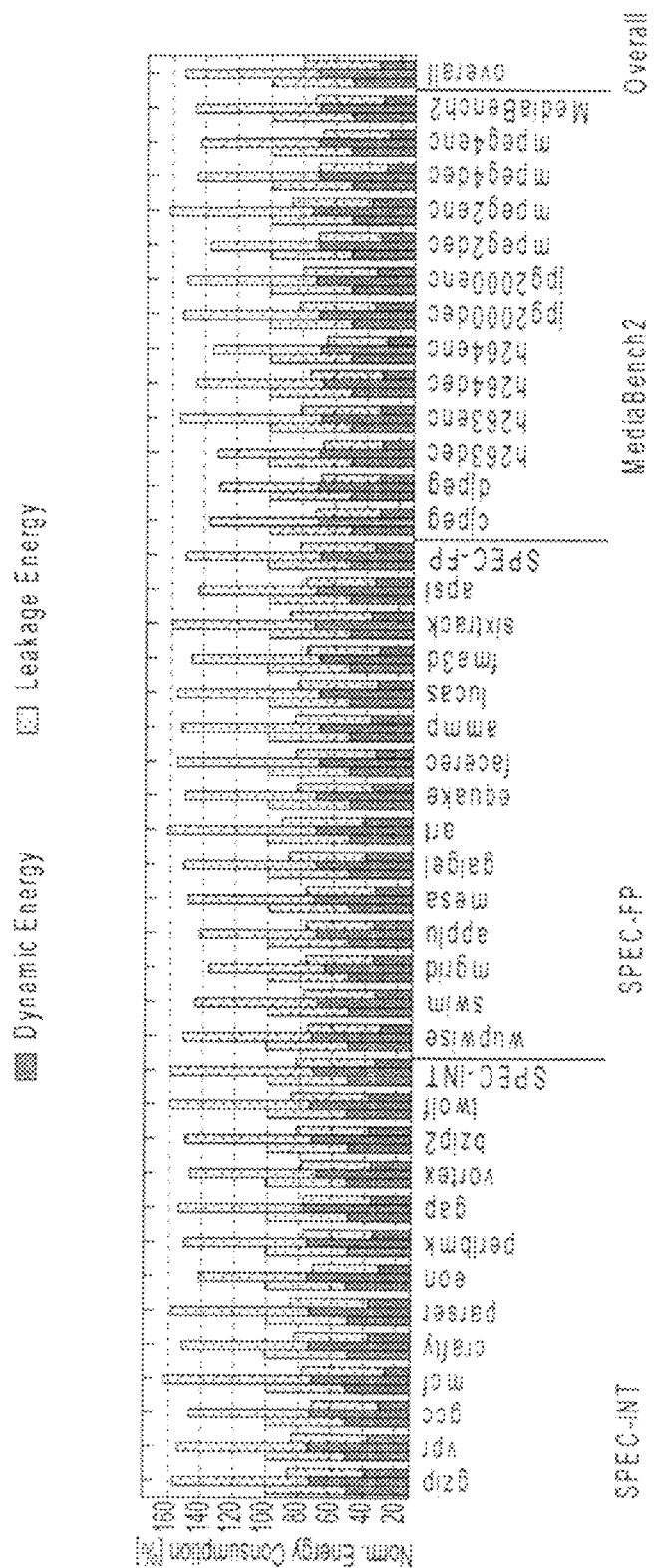
FIG. 19 illustrates results of a simulation of the normalised energy consumption achieved using the present technique.

FIG. 19 shows the dynamic and overall energy consumption of the baelines analyzed in the previous section. The 41% increase of dynamic energy consumption by Base2ld1st results from the energy required to access the additional ports of its uTLB, TLB and L1. Contrarily, MALEC saves 33% of dynamic energy compared to Base1ldst, by utilizing page-based access grouping and way determination to operate on single ported components and to perform less energy intensive "reduced cache accesses" (see Section 5). Note, the unusually high savings of MALEC for mcf orginiate in the exceptionally high miss rate of the benchmark (about 7 times the overall average). As MALEC attempts to share L1 data among loads to the same cache line; the effective number of loads accessing and missing the cache is reduced. Without this ability, MALEC would actually consume 5% more instead of 51% less dynamic energy for mcf.

As leakage contributes about 50% to the overall energy consumption in the analyzed 32 nm technology library, it is important to account for it. FIG. 19 reveals that Base2ld1st's average energy consumption actually lies 52% above Base1ldst. Reason for this is the leakage power introduced by its additional uTLB, TLB and L1 ports, which outweighs savings due to reduced computation times; for example: the additional read port increases L1 leakage power by approx. 80%, but the average computation time is only reduced by 10% (see Section 6.1). A similar effect can be observed for MALEC. Although it possesses the same number of uTLB, TLB and L1 ports as Base1ldst, it's modified cache model and the newly introduced uWT and WT induce additional leakage power. Consequently, its overall energy saving is reduced to 22%. However, comparing it to Base2ld1st, which achieves a similar performance as MALEC, it saves 48%.

Figure 21:
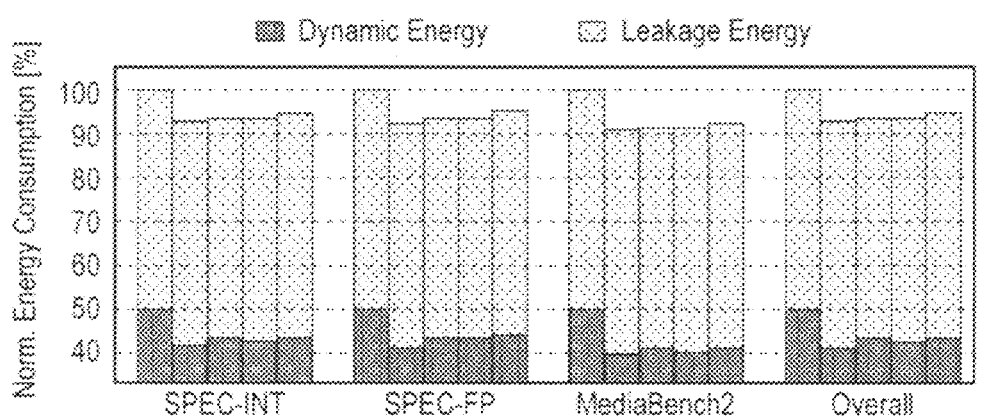
FIG. 21 compares the energy consumption of a system not using way determination, a system using the way table of the present technique, and systems using small way tables having 8, 16 or 32 entries.
Figure 22:
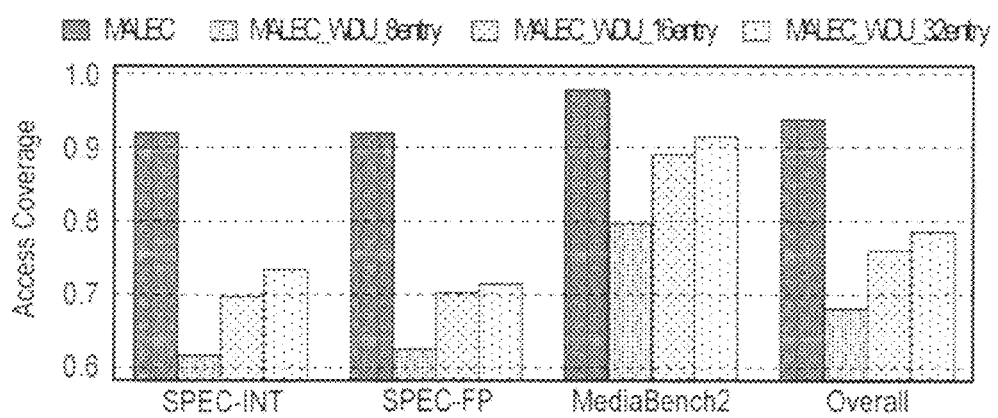
FIG. 22 illustrates the ratio of L1 accesses covered by way determination to the overall access count.

Alternative way determination schemes may be considered to reduce MALEC's leakage power. Similar to the way table proposed here, a way determination unit (WDU) (see Section 1) can be implemented to support "reduced cache accesses" as introduced in Section 5. It holds way information of recently accessed cache lines in a small buffer structure. FIG. 21 compares MALEC implementations without way determination (left column), with way tables (second left column) and with WDUs holding 8, 16 and 32 entries (other 3 columns left to right). The average dynamic energy consumption of the best WDU setup (16 entries) lies approximately 2% higher than the proposed way table scheme. There are two reasons for this. First, contrarily to the single ported way tables, a WDU requires three ports to service the up to three request handled in parallel by the analyzed MALEC implementation. As it performs fully associative lookups of tag-sized address fields, the energy per WDU access is similar to an uWT access (just 40% less for a 16 entry WDU). Second, all WDU configurations cover significantly less memory accesses than way tables (see FIG. 22), and therefore suffer the energy penalty of an increased number of "conventional" instead of "reduced cache accesses" (see Section 5). Contrarily, accounting for the low leakage power of the scheme, originating from its small size, its overall energy consumption approaches the default MALEC configuration closely (less than 1% difference in FIG. 21). However, while the energy consumption of way tables are widely unaffected by the desired number of parallel memory accesses, the WDU does not scale well. Hence, more aggressive superscalar processor or sophisticated vector extensions would clearly favour the way tables over a WDU.

One approach to directly improve MALEC's leakage power consumption is to reduce the number of uTLB entries and therefore the uWT size. However, this effectively reduces the uWT's coverage, which increases the dynamic energy consumed due to more WT accesses. Our simulations show that for the analyzed MALEC implementation this trade-off leads to overall energy consumption widely independent of the uTLB size; i.e. the energy difference between 4, 8, 16 and 32 entries is no more than 1%. Abandoning the WT completely in favour of lower leakage significantly reduces the number of L1 accesses covered by way determination. A simulation utilizing a 16 entry uWT and no WT achieved an average coverage of approximately 70%, increasing MALEC's energy consumption by 5%.

7. Conclusions

This technique addresses the problem of high energy consumption in L1 cache interfaces to high performance out-of-order superscalar processors. The Multiple Access Low Energy Cache (MALEC) is based on the observation that consecutive memory references are very likely to access the same page. It shares memory address translation results between multiple loads and stores, simplifies store and merge buffer lookup structures and shares L1 data among loads accessing the same cache line. Furthermore, it introduces a novel way determination scheme that simultaneously provides way information for all cache lines mapping to a single page. MALEC is evaluated based on simulations of a 32 nm implementation utilizing a 32 KByte, 4-way set-associative L1 data cache with 64 Byte lines and an aggressive out-of-order processor to execute SPEC CPU2000 and Media-Bench2 benchmarks. Compared to a basic cache interface, capable of servicing 1 load or store per cycle, the chosen MALEC configuration achieves 9% speedup using 12% less energy. Contrarily, a conventional interface that achieves only a slightly higher performance than MALEC consumes 51% more instead of 12% less energy than the baseline.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for a data processing apparatus comprising processing circuitry configured to issue access requests for data; a cache configured to provide access to data in response to said access requests; and a translation lookaside buffer (TLB) configured to translate between virtual page addresses specified in said access requests and physical page addresses used by said cache;

said method comprising steps of:

buffering pending access requests issued by said processing circuitry in an input buffer; and selecting which of said pending access requests from said input buffer should be serviced by said cache in each processing cycle; wherein:

said cache is configured to service up to M access requests in the same processing cycle, where M is an integer and M≥2; and said selecting step selects said pending access requests to ensure that the selected pending access requests selected for servicing by the cache in the same processing cycle specify maximum of N different virtual page addresses, where N is an integer, N<M and N≥1.

2. A data processing apparatus comprising:

processing means for issuing access requests for data;

cache means for providing access to data in response to said access requests;

translation lookaside buffer (TLB) means for translating between virtual page addresses specified in said access requests and physical page addresses used by said cache means;

input buffer means for buffering pending access requests issued by said processing means; and arbitration means for selecting which of said pending access requests from said input buffer should be serviced by said cache means in each processing cycle; wherein:

said cache means is configured to service up to M access requests in the same processing cycle, where M is an integer and M≥2; and said arbitration means is configured to select said pending access requests to ensure that the selected pending access requests selected for servicing by the cache in the same processing cycle specify a maximum of N different virtual page addresses, where N is an integer, N<M, and N≥1.

3. A data processing apparatus comprising:

processing circuitry configured to issue access requests for data;

a cache configured to provide access to data in response to said access requests;

a translation lookaside buffer (TLB) configured to translate between virtual page addresses specified in said access requests and physical page addresses used by said cache;

an input buffer configured to buffer pending access requests issued by said processing circuitry; and an arbiter configured to select which of said pending access requests from said input buffer should be serviced by said cache in each processing cycle; wherein:

said cache is configured to service up to M access requests in the same processing cycle, where M is an integer and M≥2; and said arbiter is configured to select said pending access requests to ensure that the selected pending access requests selected for servicing by the cache in the same processing cycle specify a maximum of N different virtual page addresses, where N is an integer, N<M, and N≥1.

4. A data processing apparatus according to claim 3, wherein said TLB is configured to translate up to N different virtual page addresses in the same processing cycle.

5. A data processing apparatus according to claim 3, wherein said arbiter is configured to select as candidate access requests the pending access requests specifying one of said N different virtual page addresses, and to select for servicing by said cache at least one of said candidate access requests.

6. A data processing apparatus according to claim 3, wherein N=2.

7. A data processing apparatus according to claim 3, wherein N=1.

8. A data processing apparatus according to claim 7, wherein in each processing cycle:

(i) said TLB is configured to translate the virtual page address specified by a primary access request into a physical page address, said primary access request comprising one of said pending access requests from said input buffer;

(ii) said arbiter is configured to select as candidate access requests said primary access request and the pending access requests from said input buffer that specify the same virtual page address as said primary access request; and (iii) said arbiter is configured to select at least one of said candidate access requests to be serviced by said cache using the physical page address translated by said TLB.

9. The data processing apparatus according to claim 8, wherein said primary access request is one of:

the oldest of said pending access requests;

one of said pending access requests having a highest priority; and one of said pending access requests having an access type of the highest priority.

10. The data processing apparatus according to claim 5, wherein said cache has a plurality of cache lines, and if multiple candidate access requests target data stored in the same cache line, then said arbiter is configured to merge said multiple candidate access requests to form a single merged access request.

11. The data processing apparatus according to claim 10, wherein said input buffer is configured to buffer X pending access requests, and said arbiter is configured to merge a maximum of Y candidate access requests into a single merged access request, where X and Y are integers and Y≤X.

12. The data processing apparatus according to claim 3, wherein said cache comprises M banks of cache lines for storing data, wherein each bank is accessible independently and said cache is configured to service up to M access requests directed to different banks in the same processing cycle.

13. The data processing apparatus according to claim 12, wherein for each bank of cache lines having at least one bank candidate access request specifying one of said N different virtual page addresses and targeting a cache line within said bank, said arbiter is configured:

(i) to select a first bank candidate access request of said at least one bank candidate access request;

(ii) if there are one or more other bank candidate access requests targeting the same cache line as said first bank candidate access request, to merge said one or more other bank candidate access requests with the first bank candidate access request to form a merged access request, and to select said merged access request for servicing by said bank; and (iii) if there are no other bank candidate access requests targeting the same cache line as said first bank candidate access request, to select said first bank candidate access request for servicing by said bank.

14. The data processing apparatus according to claim 13, wherein said first bank candidate access request is one of:

the oldest of said at least one bank candidate access request;

one of said at least one bank candidate access request having a highest priority; and one of said at least one bank candidate access request having an access type of the highest priority.

15. The data processing apparatus according to claim 3, wherein said input buffer comprises storage circuitry configured to store the pending access requests which are not selected by said arbiter in a current processing cycle, said pending access requests stored in said storage circuitry being available for selection by said arbiter in a following processing cycle.

* * * * *